(12) United States Patent
Vukovic et al.

(10) Patent No.: US 10,650,356 B2
(45) Date of Patent: *May 12, 2020

(54) INTELLIGENT SELF-SERVICE DELIVERY ADVISOR

(71) Applicant: International Business Machines Corporation, Armonk, NY (US)

(72) Inventors: Maja Vukovic, New York City, NY (US); Nikolaos Anerousis, Los Gatos, CA (US); Anup Kalia, Elmsford, NY (US); Jin Xiao, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/438,672

(22) Filed: Jun. 12, 2019

(65) Prior Publication Data
US 2019/0295044 A1    Sep. 26, 2019

Related U.S. Application Data

(63) Continuation of application No. 15/806,601, filed on Nov. 8, 2017, now Pat. No. 10,380,558.

(51) Int. Cl.
*G06F 9/44* (2018.01)
*G06Q 10/00* (2012.01)
(Continued)

(52) U.S. Cl.
CPC .......... *G06Q 10/20* (2013.01); *G06N 20/00* (2019.01); *G06Q 30/016* (2013.01)

(58) Field of Classification Search
None
See application file for complete search history.

(56) References Cited

U.S. PATENT DOCUMENTS

| 8,713,146 B2 | 4/2014 | Pedersen |
| 8,806,061 B1 | 8/2014 | Lobo et al. |

(Continued)

OTHER PUBLICATIONS

Mell et al., "The NIST Definition of Cloud Computing," Recommendations of the National Institute of Standards and Technology, US Department of Commerce, Special Publication 800-145, Sep. 2011, 7 pages.

(Continued)

*Primary Examiner* — Qamrun Nahar
(74) *Attorney, Agent, or Firm* — Jared C. Chaney

(57) ABSTRACT

The present invention provides a method, system, and computer program product of an intelligent self-service delivery advisor. In an embodiment, the present invention includes, in response to receiving computer system service data, identifying, by a second computer system, a computer system service category among a plurality of computer system categories, identifying, by the second computer system, one or more computer system service tasks, based on the computer system service data and the computer system service category, selecting, by the second computer system, a catalog among a plurality of catalogs, based on the one or more computer system service tasks and the computer system service data, generating, by the second computer system, one or more suggestions based on the catalog and the one or more computer system service tasks; and displaying, displaying by the second computer system, the one or more suggestion on a display logically coupled to the computer system.

17 Claims, 15 Drawing Sheets

(51) Int. Cl.
*G06Q 30/00* (2012.01)
*G06N 20/00* (2019.01)

(56) References Cited

U.S. PATENT DOCUMENTS

| 2013/0080640 | A1 | 3/2013 | Rai |
| 2014/0344006 | A1* | 11/2014 | Biazetti ............. G06Q 10/0633 705/7.27 |
| 2016/0098256 | A1 | 4/2016 | Tehrani et al. |
| 2017/0093649 | A1 | 3/2017 | Finn et al. |

OTHER PUBLICATIONS

Vukovic et al., "Intelligent Self-Service Delivery Advisory," U.S. Appl. No. 15/806,601, filed Nov. 8, 2017.
List of IBM Patents or Patent Applications Treated as Related, dated Jun. 11, 2019, 2 pages.

* cited by examiner

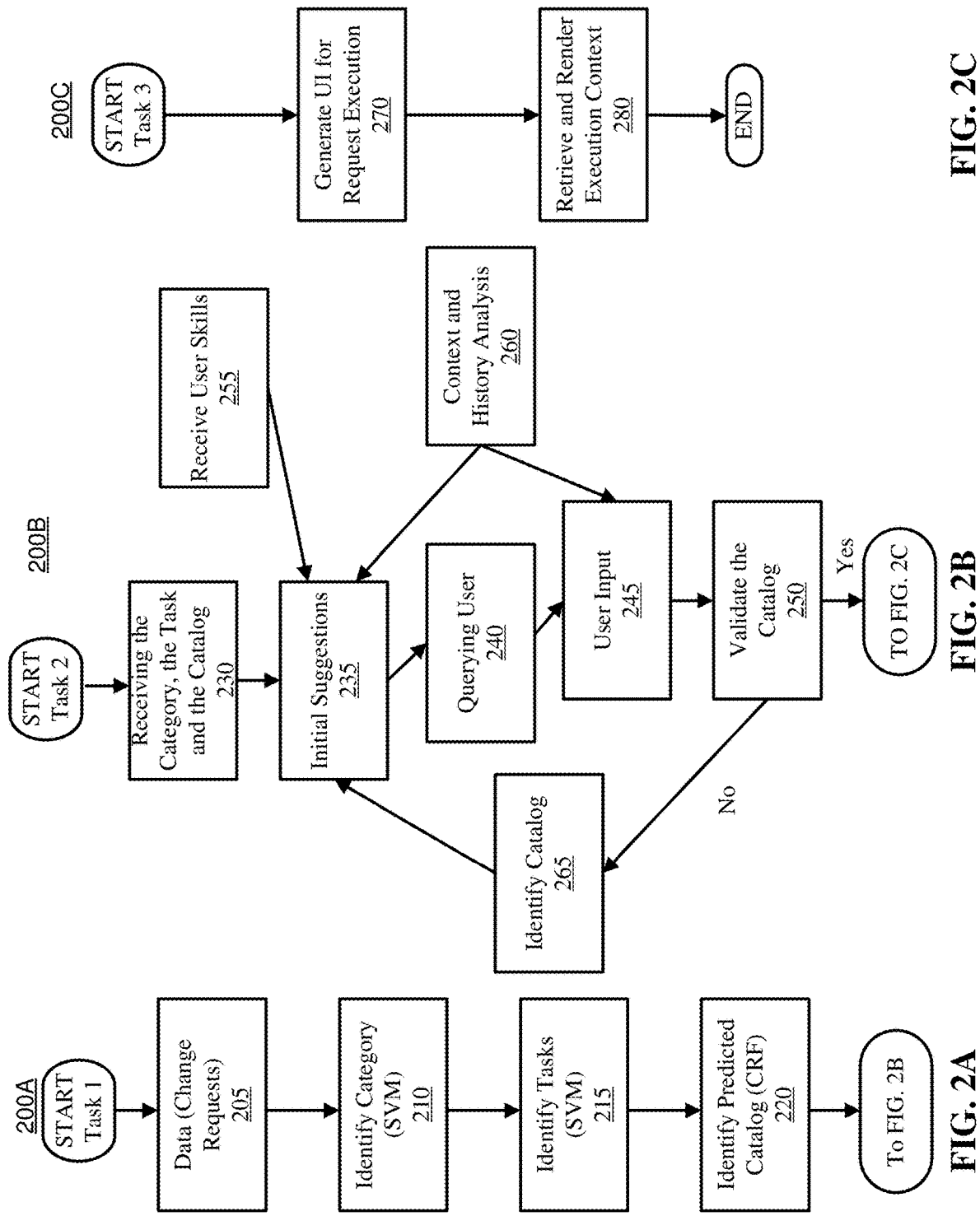

INTELLIGENT SELF-SERVICE DELIVERY ADVISOR

BACKGROUND

The present disclosure relates to integrated circuit chips, and more specifically, to intelligent self-service delivery advisor.

SUMMARY

The present invention provides a method, system, and computer program product of an intelligent self-service delivery advisor. In an embodiment, the method, system, and computer program product includes, in response to receiving computer system service data, identifying, by a second computer system, a computer system service category among a plurality of computer system categories, identifying, by the second computer system, one or more computer system service tasks, based on the computer system service data and the computer system service category, selecting, by the second computer system, a catalog among a plurality of catalogs, based on the one or more computer system service tasks and the computer system service data, generating, by the second computer system, one or more suggestions based on the catalog and the one or more computer system service tasks, and displaying, displaying by the second computer system, the one or more suggestion on a display logically coupled to the computer system.

BRIEF DESCRIPTION OF THE DRAWINGS

FIG. 2A depicts a flow diagram in accordance with an exemplary embodiment of the present invention.

FIG. 2B depicts a flow diagram in accordance with an exemplary embodiment of the present invention.

FIG. 2C depicts a flow diagram in accordance with an exemplary embodiment of the present invention.

DETAILED DESCRIPTION

The present invention provides a method, system, and computer program product of an intelligent self-service delivery advisor. In an embodiment, the method, system, and computer program product includes, in response to receiving computer system service data, identifying, by a second computer system, a computer system service category among a plurality of computer system categories, identifying, by the second computer system, one or more computer system service tasks, based on the computer system service data and the computer system service category, selecting, by the second computer system, a catalog among a plurality of catalogs, based on the one or more computer system service tasks and the computer system service data, generating, by the second computer system, one or more suggestions based on the catalog and the one or more computer system service tasks, and displaying, displaying by the second computer system, the one or more suggestion on a display logically coupled to the computer system.

Executing a change ticket can be a costly and time-consuming process that can be limited by skill, experience, knowledge, resources, and time constraints. In an IT service management process, a change ticket is assigned to an expert who is supposed to execute it. For example, a change ticket could be a request to change any parameter (e.g., hardware, software, or power) such as a change request. The expert has to navigate through an existing service catalog to serve the request. Each service catalog might have thousands of options. An expert has to select one such option and fill-in the parameters to execute the request. Since selecting an option is limited to skill, experience, knowledge of an expert, the execution could be inconsistent. Even the request submitted in the first place could be incomplete and inaccurate. This could cause a time delay from when the ticket is submitted till it gets executed. Thus, in an embodiment, the present disclosure describes an intelligent self-service delivery advisor that enhances the capability of an expert in interpreting the request and executing it. In an embodiment, an interactive service delivery advisor utilizes machine learning to analyze a change request for a computer system, information on the computer system, and the input of a user to develop change suggestions, and ultimately execution of a service ticket, for the computer system.

In an embodiment, based on a request (e.g., an email, an error report from a user or a computer system, a phone call, or any other communication from a user or computer system), the user interacts with a dynamic user interface relevant to the catalog item and that provides execution context that help a user to accomplish the required task. In an embodiment, the computer system service data relates to a change request.

Figure 1A:
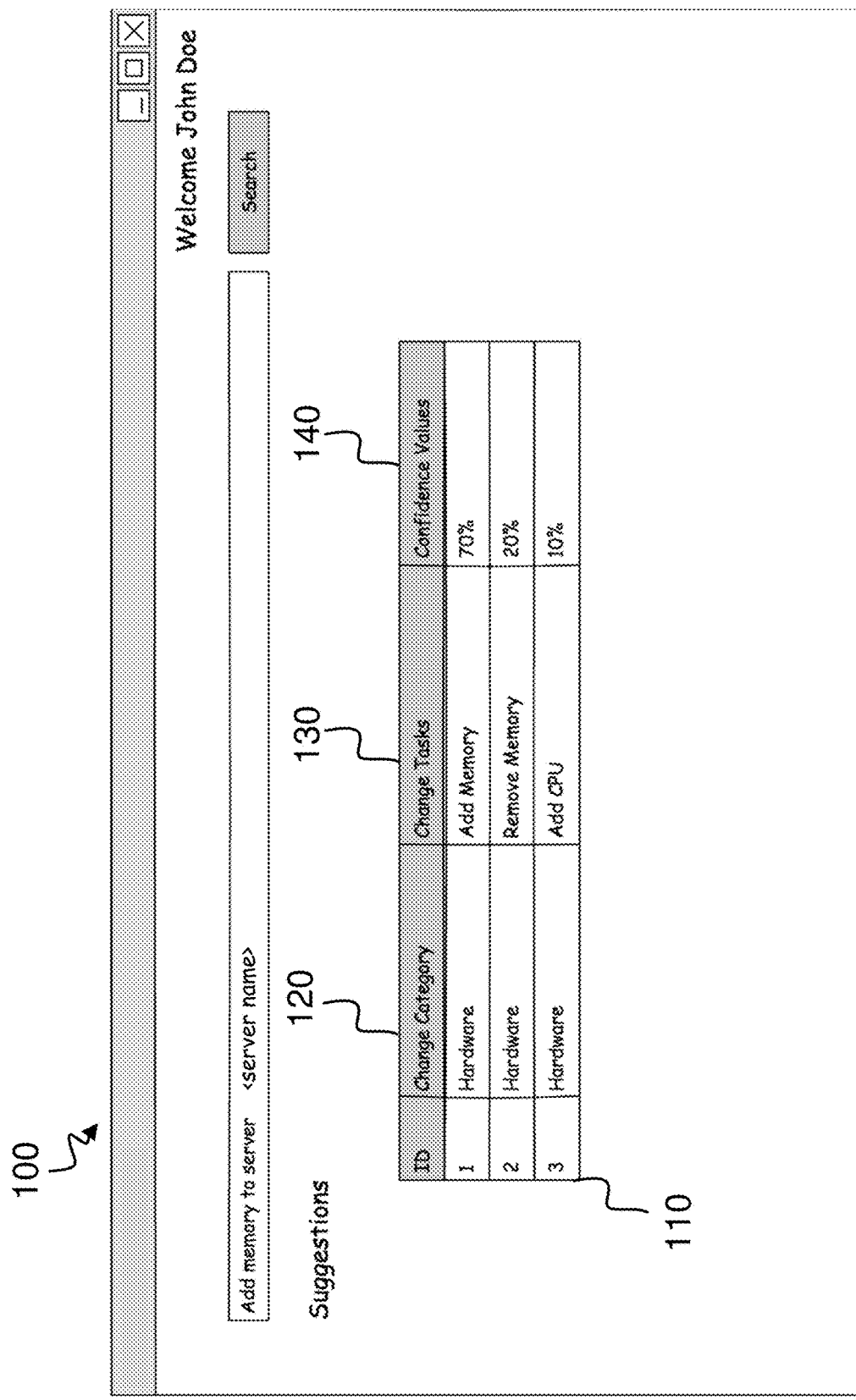
FIG. 1A depicts a graphical display in accordance with an exemplary embodiment of the present invention.

In an embodiment, referring to FIG. 1A, after receiving the request, a dynamic user interface 100 (displayed on a screen logically connected to a computer system) lists an initial group of suggestions 110. In an embodiment, the group of suggestions lists change categories from a column 120 (for example, hardware) for each suggestion, change tasks from a column 130 (for example, add memory) for each suggestion, and a confidence values from a column 140 (for example, 70%) for each suggestion. In an embodiment, the user interface is called an intelligent advisor.

In an embodiment, the advisor offers suggestions, with certain confidence to the appropriate catalog item (across multiple catalogs), that are hierarchical in nature. For example, the change tasks from column 130 for hardware issues could be: add memory→remove memory→add CPU.

For example, a set of suggestion for software issues could be, update database software→database user management→add user. In an embodiment, each suggestion will be assigned a confidence value to show the hierarchical nature of the suggestions. For example, a set of suggestions for a hardware issue with confidence values from column 140 could be: add memory 70%, remove memory 20%, and add CPU 60%. In an embodiment, a confidence value from column 140 is the likelihood that a suggestion will resolve the issue.

Figure 1B:
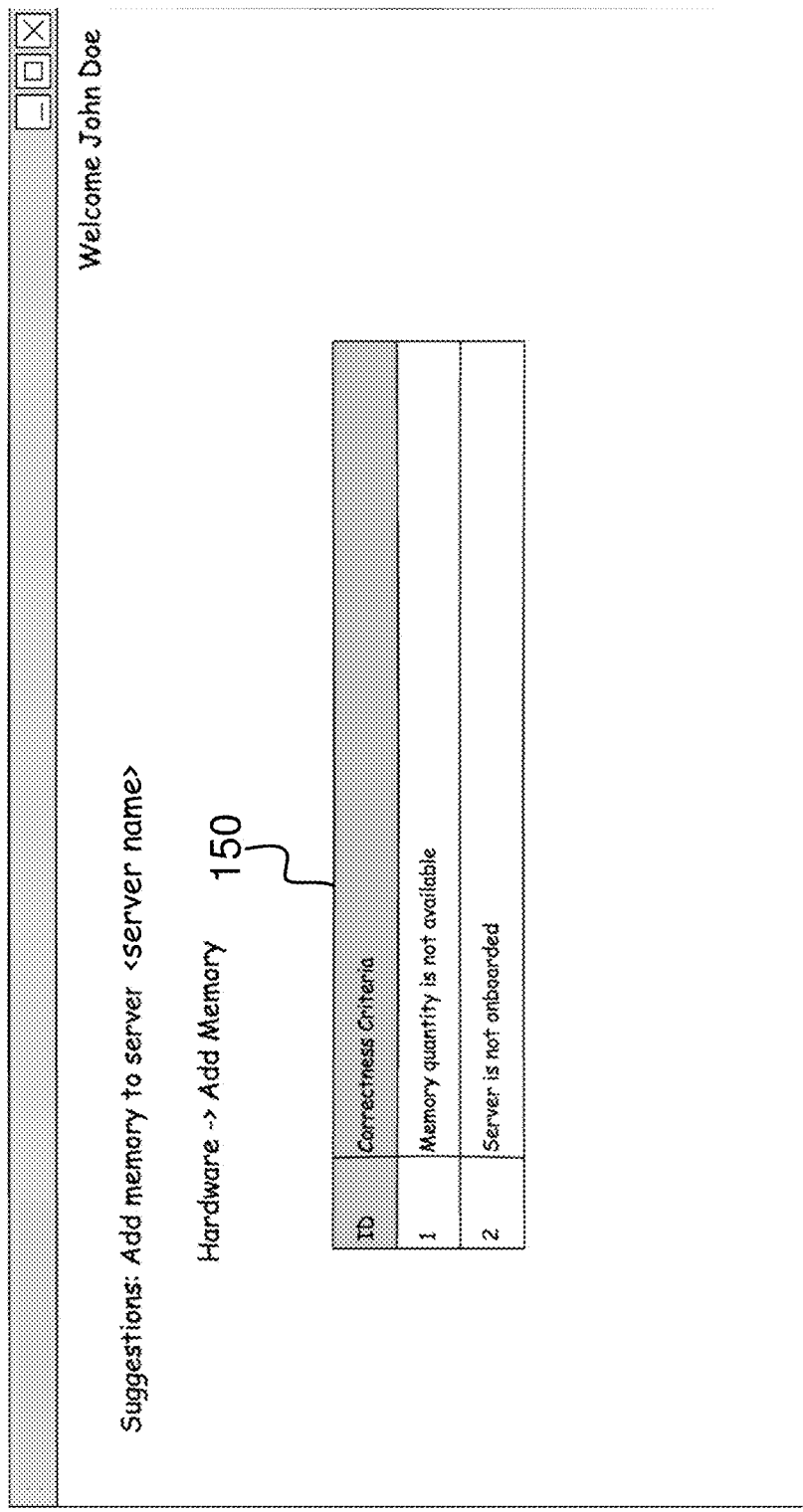
FIG. 1B depicts a graphical display in accordance with an exemplary embodiment of the present invention.

In an embodiment, the intelligent self-service delivery advisor includes accessing, by the computer system, accessing, by the second computer system, a skill level of a user with respect to at least one of the computer system service category among the plurality of computer system service categories, the one or more computer system service tasks, and the catalog, and modifying, by the second computer system, an amount of detail given in the one or more suggestions, based on the skill level Referring to FIG. 1B, in an embodiment, the advisor provides a correctness criterion from column 150. In an embodiment, the advisor accesses the skill level of the user and provides appropriate guidance and/or recommendation on the parameters and execution endpoint for the user to provide additional information. In an embodiment, based on one or more previous selections by the user, personalizing, by the second computer system, the one or more suggestions via machine learning.

Figure 1C:
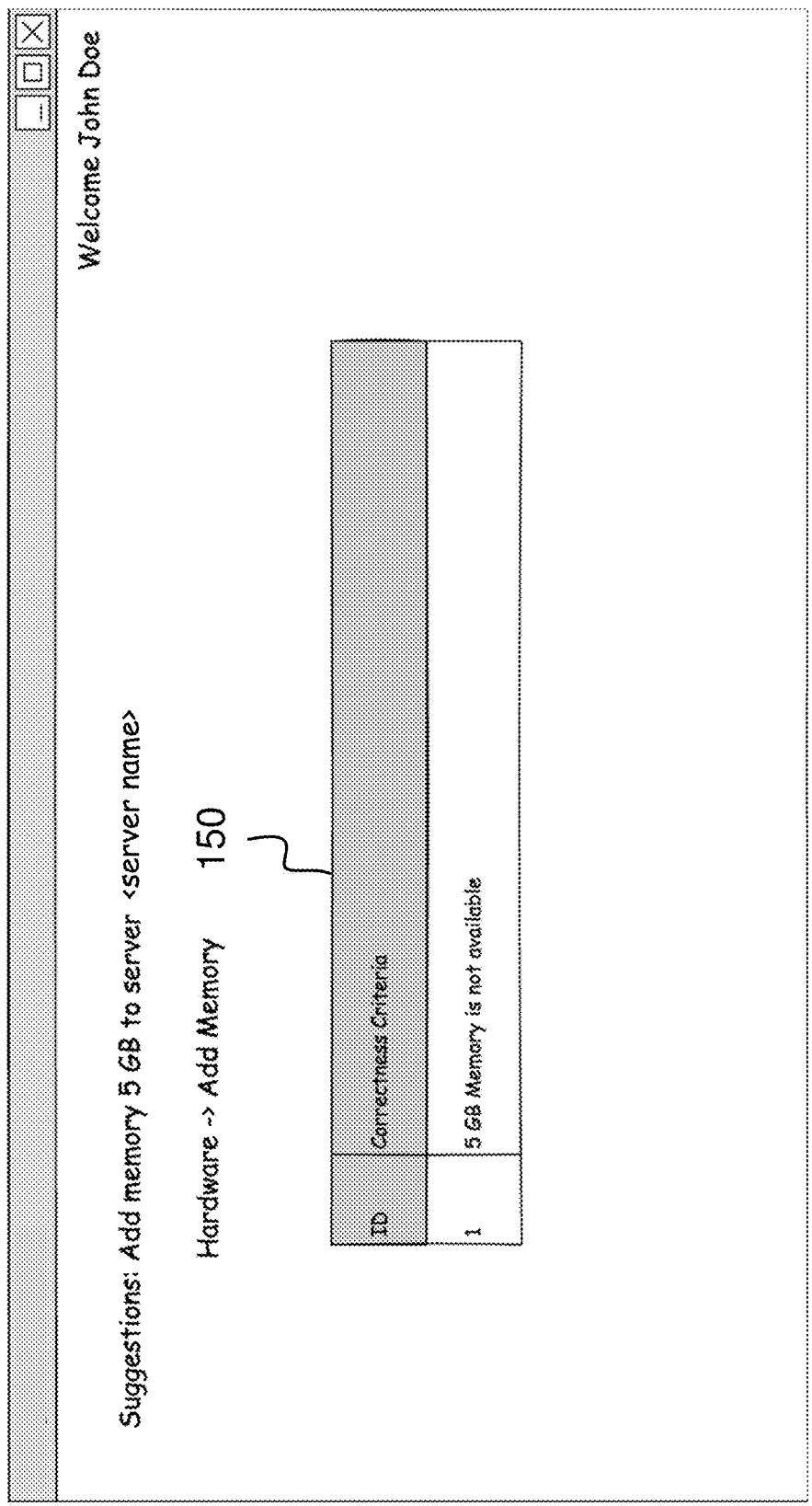
FIG. 1C depicts a graphical display in accordance with an exemplary embodiment of the present invention.

Referring to FIG. 1C, in an embodiment, the dynamic user interface 100 will provide information on why a selection is not available, e.g., a correctness criterion from column 150. For example, the advisor provides one or more selections for a user. The advisor then prompts the user for additional information, such as a computer system identifier. Based on receiving the additional information, the advisor processes the additional information with each selection. When the advisor determines that there is an issue with the selection, the advisor informs the user of the issue (e.g., 5 GB memory is not available) by a correctness criterion from column 150.

Figure 1D:
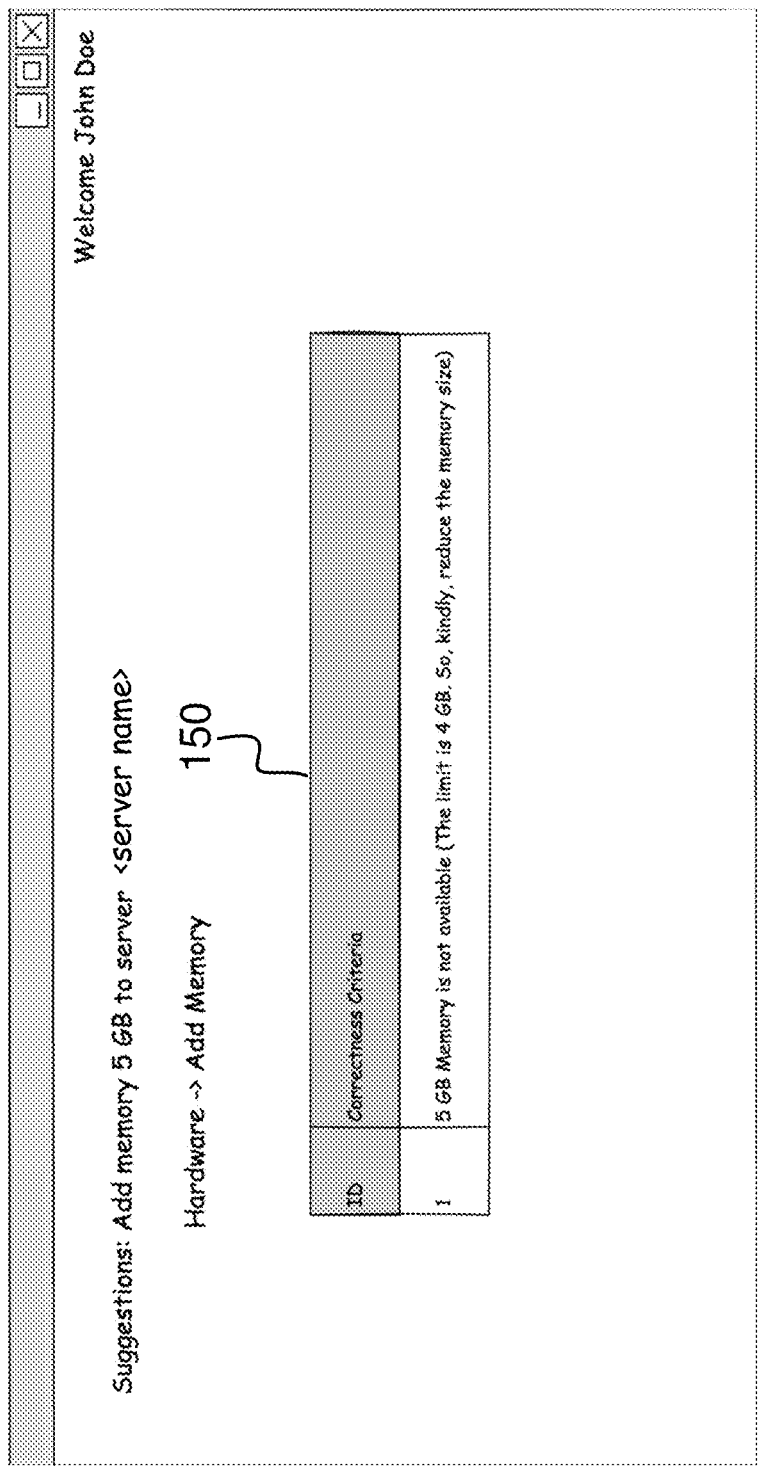
FIG. 1D depicts a graphical display m in accordance with an exemplary embodiment of the present invention.

Referring to FIG. 1D, in an embodiment, upon receiving information or data on the user's skill level, the advisor can modify the information presented on the user interface (i.e., displayed on the screen) to accommodate the user's skill level. For example, for an advanced user the display could merely say "5 GB memory is not available" (as shown in FIG. 1C). Alternatively, for a novice user could give more details such as "5 GB memory is not available (the limit is 4 GB. So, kindly, reduce the memory size)." Thus, the information given to a user is modified to give the user the information the user needs, based on his skill level, to complete the service ticket.

In an embodiment, the advisor provides a series of suggestions for the user to complete and correct a request that would appropriately map to a catalog service and increase user level of skill and confidence in the self-service solution.

In an embodiment, the advisor produces a dynamic user interface (UI) with filled parameters based on the request provided by the user. Dynamic UI is implemented using different media and support user accessibility.

In an embodiment, the advisor, based on the history of the user, computes the skill of the user and refines the suggestions using the skill of the user such that the level of detail matches the skill level of the user.

Figure 1E:
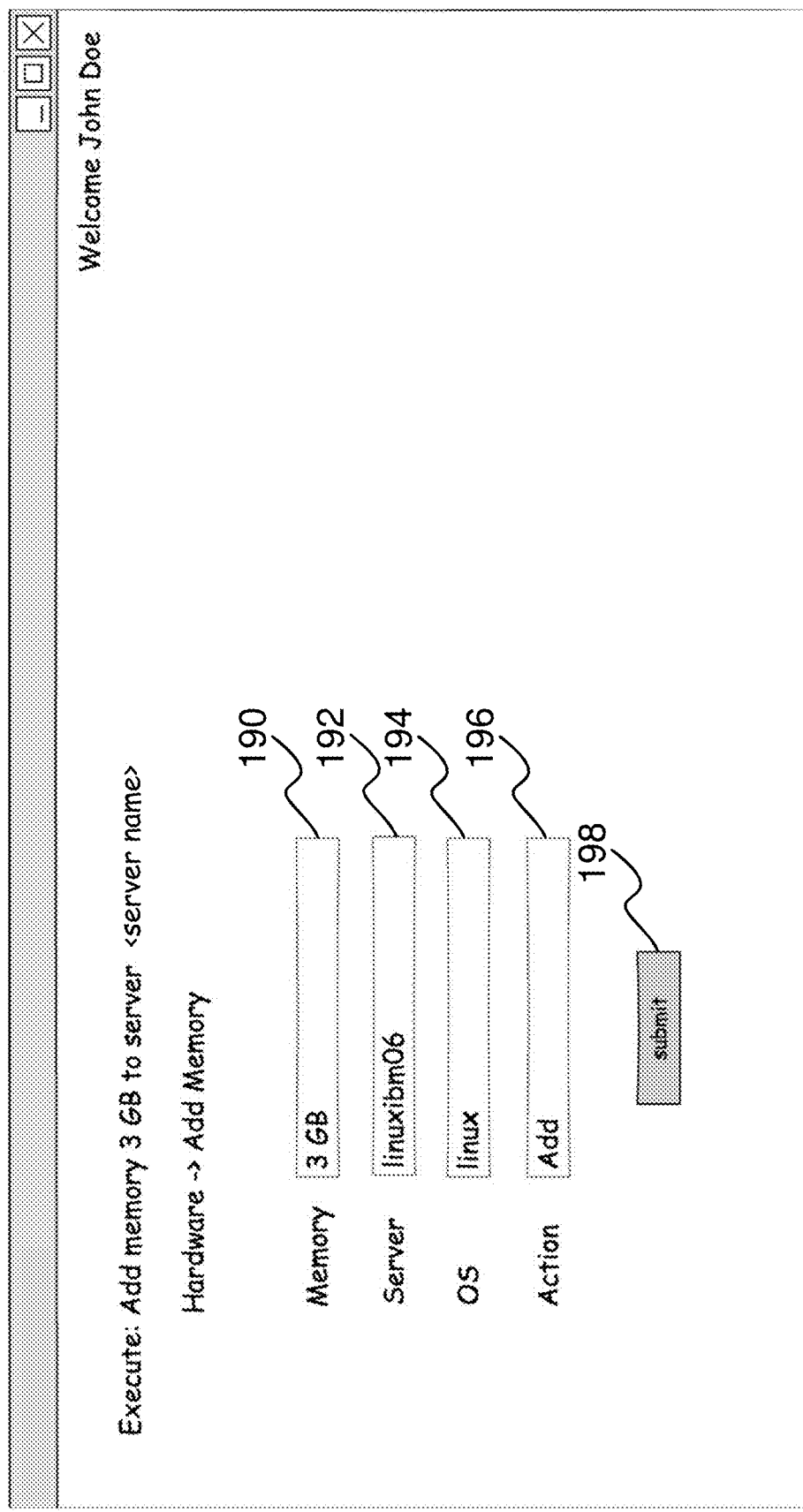
FIG. 1E depicts a graphical display in accordance with an exemplary embodiment of the present invention.

In an embodiment, the intelligent self-service delivery advisor includes in response to receiving a task selection, generating, by the second computer system, execution content. Referring to FIG. 1E, in an embodiment, the advisor will summarize the service ticket and provide a way for the user to submit the service ticket. For example, the advisor could propose a hardware modification of adding memory. A box 190 could display that 3 GB of memory will be added. A box 192 could display the server identifier (e.g. linuxibm06). A box 194 could display the operating system (OS), in this case linux. A box 196 could display the action "add" denoting that the memory will be added. A box 198 could be a "submit" button that the user can activate to send the service ticket.

In an embodiment, the intelligent self-service delivery advisor is separated into three tasks. In an embodiments these tasks can be combined into one operation or series of operations to be performed sequentially.

Task 1

Referring to FIG. 2A, in an embodiment, the intelligent self-service delivery advisor has a task 1 200A including an operation 205 of collecting change requests data, an operation 210 of identifying a category, an operation 215 of identifying tasks, and an operation 220 of identifying a predicted catalog.

In an embodiment, after receiving a change request from operation 205, operation 210 of identifying a category includes labeling a set of data (e.g., 1000 rows) with the corresponding labels (including database, hardware, operating system (OS) management, etc.), preprocessing the data to remove punctuations and stopwords, extracting unigram tokens, creating a model using Support Vector Machine (SVM) classifier, evaluating the model using K-Fold cross validations, predicting on a new dataset using the model to evaluate its effectiveness. Stopwords refer to words that are not useful for predictions. In an embodiment, the labels are used to identify sections of the catalog with relevant information. In an embodiment, a unigram token is derived from N-gram where N is number of co-occurring words in a given window. For example, consider a change request "increase 2vcpu in server abc01". If N=1, we extract unigram tokens from the sentence such as "increase", "2vcpu", "in", "server", and "abc01". If N=2, we extract bigram tokens such as "increase 2vcpu", "2vcpu in", "in server" and "server abc01".

In an embodiment, operation 215 of identifying tasks includes (labeling a set of data (e.g., 1000 rows) with the corresponding labels, preprocessing the data to remove punctuations and stopwords, extracting unigram tokens, creating a model using Support Vector Machine (SVM) classifier, evaluating the model using K-Fold cross validations, predicting on a new dataset using the model to evaluate to evaluate its effectiveness) for each category to identify tasks. For example, for a database, label the dataset with labels=database update, database backup, database move, and so on. For example, first a category could be identified (hardware).

In an embodiment, operation 220 of identifying a predicted catalog includes labeling words in a sentence, creating a model using conditional random field (CRF) classifier, perform K-Fold cross validations, and predicting on a new dataset using the model to evaluate its effectiveness. For example, for a database, the labels could be action, database instance, client, and/or server instance. For example, for hardware, the labels could be action, memory quantity, and/or server instance. In an embodiment, the catalog is a data source that has information on a computer system (e.g., server, type of server, class of server, computer, type of computer, class of computer, device, type of device, class of device, etc.)

Task 2

Referring to FIG. 2B, in an embodiment, intelligent self-service delivery advisor has a task 2 200B including an operation 230 of receiving category, tasks, and the catalog, an operation 235 of providing initial suggestions for the execution of the service request, an operation 240 of querying the user on additional parameters by displaying on a screen logically connected to a computer system, and an operation 245 of receiving user input on the querying, an operation 250 of a decision step to valid catalog with "yes" going to FIG. 2C, and "no" going to an operation 265 of identify catalog and then back to operation 235 of providing initial suggestions. In an embodiment, operation 240 is a querying for one or more missing parameters of the requested computer system service data in light of the catalog. In an embodiment, the method further includes, in response to receiving the one or more missing parameters, generating, by the second computer system, one or more modified suggestions. In an embodiment, the method further includes, in response to receiving the one or more missing parameters, selecting a catalog among the plurality of catalogs. In an embodiment, the method, system, and computer program product includes, in response to the displaying, identifying, by the second computer system, missing parameters with respect to the computer system service data, querying, of a user, one or more of the missing parameters of the received computer system service data in light of the catalog.

In an embodiment, the user's input (including cognitive and contextual state) is analyzed by the advisor to map it to the appropriate catalog service. Cognitive state is one of more of: distracted, has a disability/precondition, tired, etc. Context is one or more of: at the desk, on a mobile device, etc. The advisor provides a series of suggestions with appropriate confidence values for the user to make the appropriate selection (e.g. if even to route the user to self-service solution).

In an embodiment, the intelligent self-service delivery advisor further includes an operation 255 of receiving the user's skill level. For example, operation 255 could include receiving a single qualifier in the form of a number (e.g., level 4, or 40% proficient) or a qualifier (e.g. novice, intermediate, or advanced), or receiving information on the user that is used to determine a skill level of a user. In an embodiment, the user's skill level is used to determine a level of detail needed for the suggestions. For example, an advanced or expert user could need only basic information on a particular suggestion, while a novice user could need a detailed explanation detailing aspects of each suggestion or even supplemental references to explain components or procedures not within the user's knowledge base. For example, if the advanced user requests DDR 4 RAM with a data rate of 21333 MT/s, the system could provide that the frequency is outside the valid range of 2133 to 3200 MT/s, whereas a novice user could simply be told that the requested RAM is invalid and provide the novice user with a choice of valid selections. In an embodiment, each user is given a skill level (for example, from 0 to 100), the skill level is modified over time as the user's skill in the technological area improves. In an embodiment, for computing skill of a user, appropriate regression model can be trained with information on each user to provide a tailored suggestion for each user. In an embodiment, based on receiving new user information, the regression model predicts a new skill score for the user. In an embodiment, the suggestions are refined based on the new skill score for the user. In an embodiment, the refinement can be made based on recommendation techniques such collaborative or content-based filtering techniques. In an embodiment, the intelligent self-service delivery advisor can learn from the interaction with the user and user choices to update state and personalize recommendation for the future (and improve recommendation to other similar tasks and user roles).

In an embodiment, the intelligent self-service delivery advisor further includes an operation 260 of receiving context and history analysis, where the history of the user's selections and input for previous computer system issues are analyzed to provide input for the initial suggestions. For example, the history of the user's previous suggestion choices could be analyzed to narrow the number of suggestions to only those suggestion the user is likely to choose. Also, for example, the history of the computer systems that the user has worked on could be analyzed to determine the likely computer systems the user is processing the service ticket for.

In an embodiment, operation 240 involves generating queries based on an analysis of the information needed to generate a subsequent set of suggestions. In an embodiment, the method repeats one or more of the operations to before ending the first task. For example, after completing operation 250 a first time, the information gleamed from the operations could be used to regenerate an initial set of suggestions where it is determined that more information is needed from the user. In an embodiment, upon receiving the user input, the catalog is validated again.

Task 3

Referring to FIG. 2C, in an embodiment, intelligent self-service delivery advisor has a task 3 200C including an operation 270 of using a rule based approach to generate a dynamic user interface, and operation 280 of retrieving execution context information for the user (e.g., min./max. entitled CPU, endpoint OS type, etc.) and render it accordingly in the dynamic user interface. In an embodiment, based on the parameters and properties in the catalog, appropriate widgets are rendered in the form of text boxes, checkboxes, etc. In an embodiment, the intelligent self-service delivery advisor uses a machine learning based model prepared by learning which parameter maps what kind of claim requests. For example, when a user provides a change request, using operation 205, the intelligent self-service delivery advisor preprocess the data to remove stopwords and lemmatize the words. Lemmatization provides the base form of a word. Once the intelligent self-service delivery advisor receives the preprocessed data, in 210 and 215 the intelligent self-service delivery advisor further extracts relevant features and then, using a machine learning model trained using support vector machine (SVM), predicts the category and task associated with the change request. For example, for a change request "increase 2vcpu in server abc001", operations 210 and 215 predicts the category as "hardware" and task as "cpu". Once, the intelligent self-service delivery advisor extracts the task, it uses operation 220, where it invokes a model trained using conditional random fields (CRF). The model extracts the parameters from the change request such as "action: increase", "cpu: 2vcpu", and "server: abc001". Based on the parameters predicted other operations such as 230, 235, 240, 245, 250, 255 and 260 are invoked for recommendation of appropriate parameters.

Figure 3:
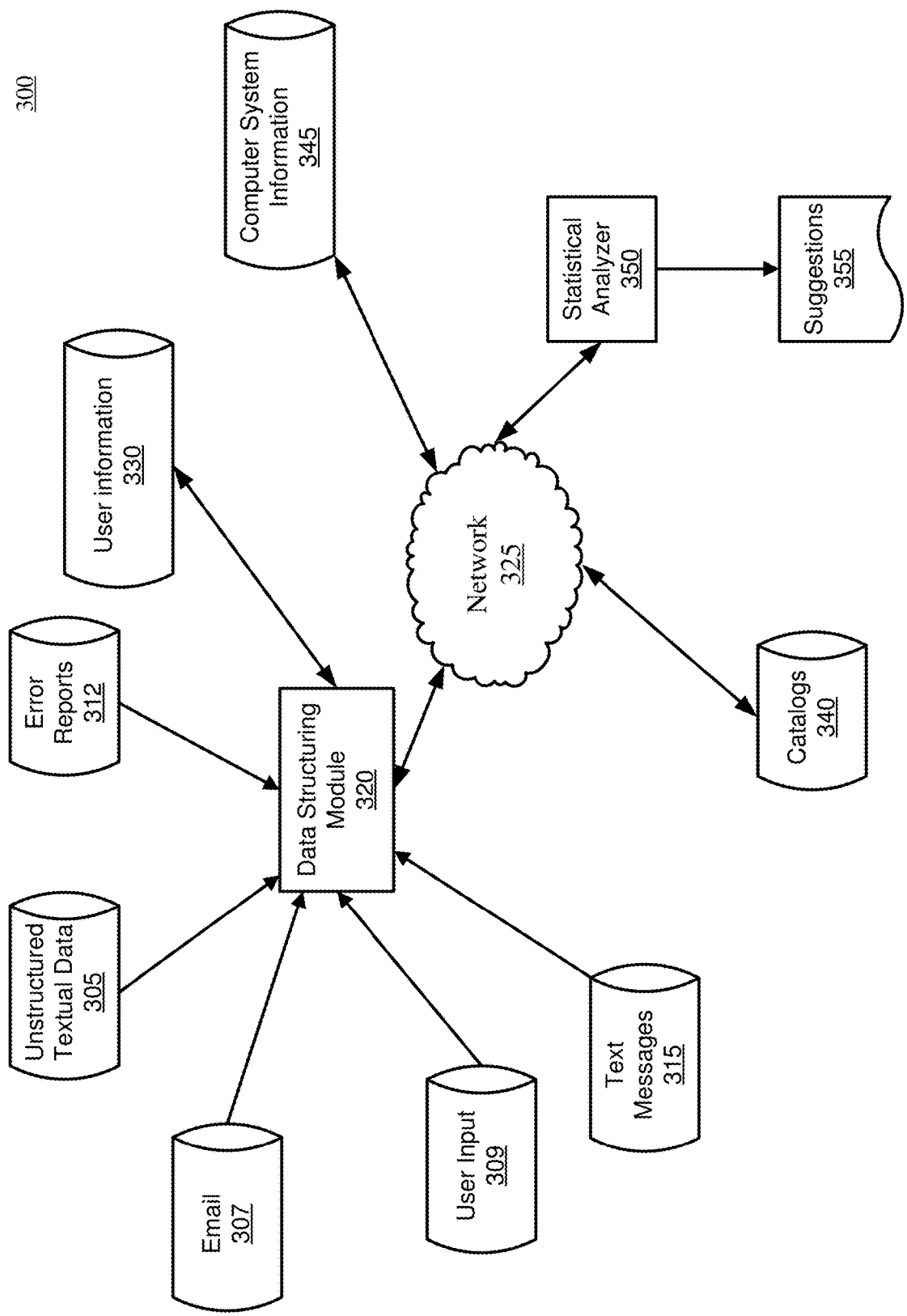
FIG. 3 depicts a block diagram in accordance with an exemplary embodiment of the present invention.

Referring now to FIG. 3, in an embodiment, an example network environment 300 includes a plurality of data sources, such as a source of unstructured textual data 305, error reports 312, user input 309, emails 307, text messages 315, user information 330, catalogs 340, and computer system information 345. In an embodiment, the data sources (e.g., unstructured textual data 305, error reports 312, user input 309, emails 307, text messages 315, user information 330, catalogs 340, and computer system information 345) resides in the storage of a single device, or is distributed across the storage of a plurality of devices. Data collected from the data sources includes historical data (e.g., data corresponding to previous repairs). In an embodiment, a single type of data (e.g., catalogs 340) resides in the storage of a single device, or resides in the storage of several devices connected either locally or remotely via a network, such as a network 325. In an embodiment, the data sources and other devices connected to network 325 are local to each other, and communicate via any appropriate local communication medium.

In an embodiment, a data structuring module 320 includes, or is a part of, a device for converting unstructured, raw data (e.g., textual data, images, videos, sound recordings, etc.) into structured data (e.g., machine-readable data) that a computer system utilizes.

In an embodiment, user information 330 includes data relevant to the technical skill of a user. For example, user information 330 could be a self-assessment of technical skill, education, duration in the user's current job, relevant experience, experience with the problem in question.

In an embodiment, catalogs 340 includes any data regarding the computer or server systems. For example, catalogs 340 includes repair/servicing information for a particular computer system (e.g., a server), a class of computer system (e.g. a class of servers), general repair/servicing information, and/or general computer system information.

In an embodiment, computer system information 345 includes data collected from or about the computer system involved in the system ticket. For example, an email reporting a computer system issue could include information on the computer system. For example, in a computer system generated report, the computer system could include identification information.

In an embodiment, the various data sources, the data structuring module 320 and a statistical analyzer 350 are connected via network 325. The network 325 can be implemented using any number of any suitable communications media. For example, the network 325 could be a wide area network (WAN), a local area network (LAN), an internet, or an intranet. For example, the data structuring module 320 and statistical analyzer 350 and one or more data sources could communicate using a local area network (LAN), one or more hardwire connections, a wireless link or router, or an intranet. In an embodiment, the data structuring module 320, statistical analyzer 350, and/or one or more data sources are communicatively coupled using a combination of one or more networks and/or one or more local connections. For example, the data structuring module 320 is hardwired to the statistical analyzer 350 (e.g., connected with an Ethernet cable) while the data sources could communicate with the data structuring module 320 and statistical analyzer 350 using the network 325 (e.g., over the Internet).

In an embodiment, the network 325 can be implemented within a cloud computing environment, or using one or more cloud computing services. Consistent with various embodiments, a cloud computing environment includes a network-based, distributed data processing system that provides one or more cloud computing services. Further, a cloud computing environment includes many computers (e.g., hundreds or thousands of computers or more) located within one or more data centers and configured to share resources over the network 325.

In an embodiment, data structuring module 320 and/or statistical analyzer 350 employs "crawlers" or "scrapers" to access the various data sources to mine relevant data at particular intervals, or in real-time. Crawlers/scrapers are configured to "patrol" in search of relevant data (e.g., unstructured textual data 305, error reports 312, user input 309, emails 307, text messages 315, user information 330, catalogs 340, computer system information 345, etc.) in the data sources, such error reports 312, user input 309, emails 307, text messages 315, user information 330, catalogs 340, and computer system information 345. For example, a crawler is configured to identify and retrieve information on the servicing issue, to identify and retrieve information on the computer system, to identify and retrieve change request records for a particular demographic or a particular individual, etc. Crawlers are configured to "crawl" through a database or data source at a given interval, and/or to retrieve documents that have been updated or modified subsequent to a previous retrieval. A document fitting the crawler's parameters is retrieved, and if needed, analyzed and converted from an unstructured state into a structured state via data structuring module 320.

In an embodiment, structured data is said to contain sets of features (e.g., events preceding, attributes, characteristics, etc.) of computer issues. The data from each data source is said to contain a single feature set. For example, the data from the source containing error reports is a first feature set, the data from the source containing computer system information 345 is a second feature set, and so on. Once the feature set from each available data source is collected, it is combined to create a complete feature set.

In an embodiment, a complete feature set (e.g., a set of all features related to a computer system issue, computer system, or user skill level) is utilized by statistical analyzer 350, using the methods described herein (e.g., kMeans clustering), to determine correlations between features (e.g., characteristics, user skill level, technical requirements, etc.) of a particular computer system issue (e.g., requirement, malfunctioning components, etc.) and possible solutions. For example, statistical analyzer 350 could identify that memory is low in a particular computer system. Possible solutions could include replacing memory, installing new more efficient software, etc. In an embodiment, k-means clustering aims to partition n observations into k clusters in which each observation belongs to the cluster with the nearest mean, serving as a prototype of the cluster.

In an embodiment, statistical analyzer 350 generates suggestions 355. In an embodiment, suggestions 355 are generated by considering all data relevant to the change request (e.g., a plurality of complete feature sets) that correlate to fulfilling the change request. Particular features within the suggestions 355 are weighted. For example, replacing the memory with a higher memory component is more likely to resolve the issue than upgrading software. In one example, the confidence value for adding new memory could have a confidence value (likelihood of resolving the issue) of 90% and upgrading the software could have a confidence value of 10%.

Figure 4:
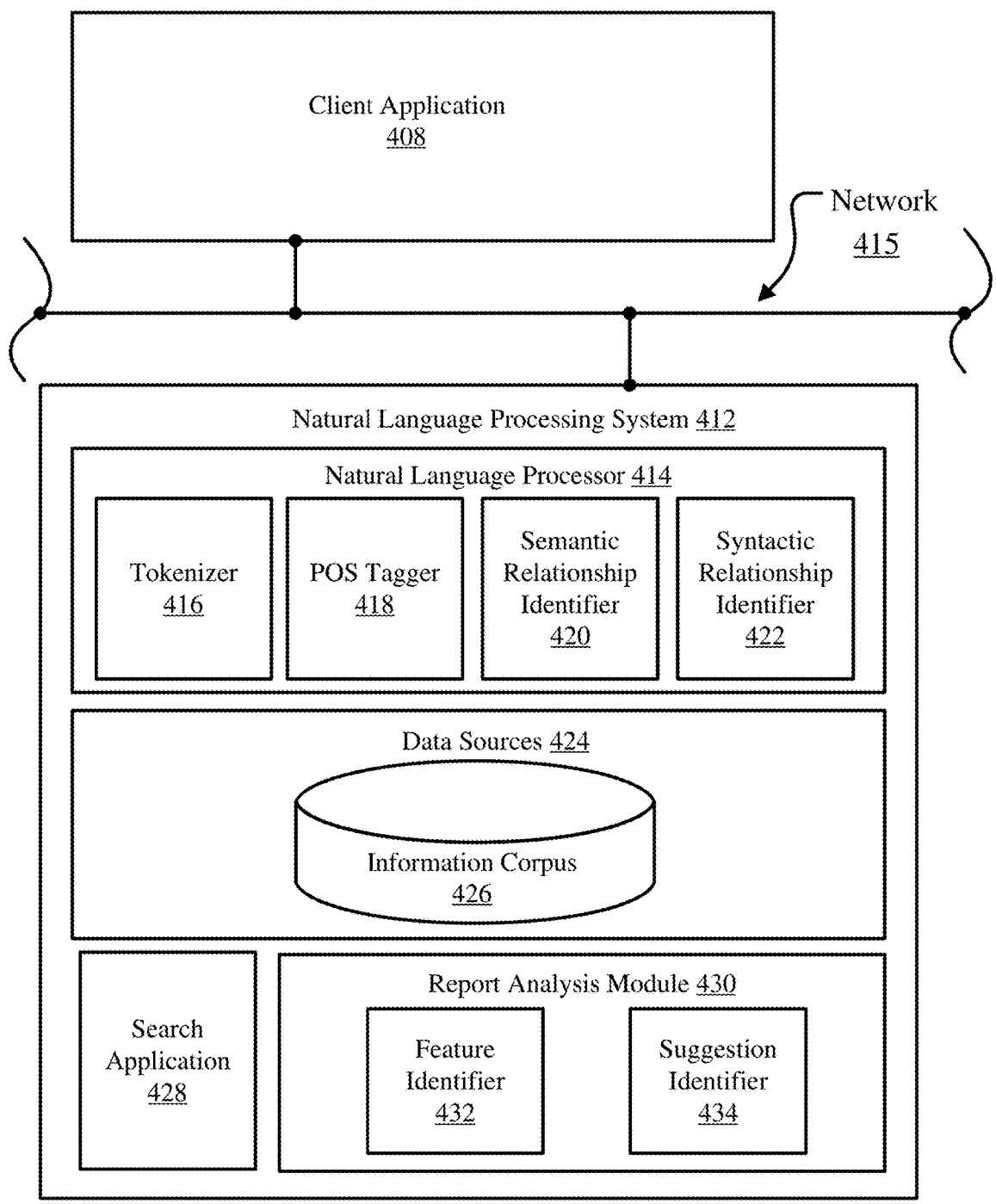
FIG. 4 depicts a block diagram in accordance with an exemplary embodiment of the present invention.

Referring to FIG. 4, in an embodiment, illustrated is a block diagram of an example natural language processing system configured to analyze error data, user skill information, or any other report with unstructured textual data, in accordance with embodiments of the present disclosure. In an embodiment, a remote device (such as a device containing one or more of the data sources described in FIG. 3) submits electronic documents (such as textual error reports, or other unstructured textual reports) to be analyzed to a natural language processing system 412 which is a standalone device, or part of a larger computer system. In an embodiment, natural language processing system 412 includes a client application 408, which itself involves one or more entities operable to generate or modify information in the unstructured textual report(s) that is then dispatched to natural language processing system 412 via a network 415, which in some embodiments is consistent with network 325.

In an embodiment, the natural language processing system 412 responds to electronic document submissions sent by client application 408. In an embodiment, specifically, natural language processing system 412 analyzes a received unstructured textual report (e.g., unstructured textual data 305, error reports 312, user input 309, emails 307, text messages 315, user information 330, catalogs 340, computer system information 345, etc.) to identify a feature or feature set (e.g., one or more characteristics of the error report, such as the specific server, problem or issue, desired performance parameter, system limitation, etc.), and one or more suggestion (e.g., how to resolve the service issue).

Likewise, in an embodiment, natural language processing system 412 analyzes a received unstructured textual report relating to the user skill level. If a user skill level is not provided to client application 408, a skill of a user could be determined using natural language processing system 412 to analyze information relating to the user's technical skill. For example, natural language processing system 412 could analyze a received unstructured textual report including the user's education, experience, etc. to determine a relative skill level.

In an embodiment, natural language processing system 412 includes a natural language processor 414, data sources 424, a search application 428, and a report analysis module 430. Natural language processor 414 is a computer module that analyzes the received unstructured textual reports and other electronic documents. In an embodiment, natural language processor 414 performs various methods and techniques for analyzing electronic documents (e.g., syntactic analysis, semantic analysis, etc.). Natural language processor 414 is configured to recognize and analyze any number of natural languages. In an embodiment, natural language processor 414 parses passages of the documents. Further, natural language processor 414 includes various modules to perform analyses of electronic documents. These modules include, but are not limited to, a tokenizer 416, a part-of-speech (POS) tagger 418, a semantic relationship identifier 420, and a syntactic relationship identifier 422.

In an embodiment, tokenizer 416 is a computer module that performs lexical analysis. In an embodiment, tokenizer 416 converts a sequence of characters into a sequence of tokens. A token is a string of characters included in an electronic document and categorized as a meaningful symbol. Further, in an embodiment, tokenizer 416 identifies word boundaries in an electronic document and breaks any text passages within the document into their component text elements, such as words, multiword tokens, numbers, and punctuation marks. In an embodiment, tokenizer 416 receives a string of characters, identify the lexemes in the string, and categorizes them into tokens.

In an embodiment, POS tagger 418 is a computer module that marks up a word in passages to correspond to a particular part of speech. In an embodiment, POS tagger 418 reads a passage or other text in natural language and assigns a part of speech to each word or other token. In an embodiment, POS tagger 418 determines the part of speech to which a word (or other text element) corresponds, based on the definition of the word and the context of the word. The context of a word is based on its relationship with adjacent and related words in a phrase, sentence, or paragraph. In an embodiment, the context of a word is dependent on one or more previously analyzed electronic documents. In an embodiment, the output of natural language processing system 412 populates a text index, a triple store, or a relational database to enhance the contextual interpretation of a word or term. Examples of parts of speech that is assigned to words include, but are not limited to, nouns, verbs, adjectives, adverbs, and the like. Examples of other part of speech categories that POS tagger 418 could assign include, but are not limited to, comparative or superlative adverbs, wh-adverbs, conjunctions, determiners, negative particles, possessive markers, prepositions, wh-pronouns, and the like. In an embodiment, POS tagger 418 tags or otherwise annotates tokens of a passage with part of speech categories. In an embodiment, POS tagger 418 tags tokens or words of a passage to be parsed by natural language processing system 412.

In an embodiment, semantic relationship identifier 420 is a computer module that is configured to identify semantic relationships of recognized text elements (e.g., words, phrases) in documents. In an embodiment, semantic relationship identifier 420 determines functional dependencies between entities and other semantic relationships.

Consistent with various embodiments, the syntactic relationship identifier 422 is a computer module that is configured to identify syntactic relationships in a passage composed of tokens. In an embodiment, the syntactic relationship identifier 422 determines the grammatical structure of sentences. For example, which groups of words are associated as phrases and which word is the subject or object of a verb. In an embodiment, the syntactic relationship identifier 422 conforms to formal grammar.

In an embodiment, natural language processor 414 is a computer module that parses a document and generates corresponding data structures for one or more portions of the document. For example, in response to receiving an unstructured textual report at natural language processing system 412, natural language processor 414 could output parsed text elements from the report as data structures. In an embodiment, a parsed text element is represented in the form of a parse tree or other graph structure. To generate the parsed text element, natural language processor 414 triggers computer modules 416-422.

In an embodiment, the output of natural language processor 414 is used by search application 428 to perform a search of a set of (i.e., one or more) corpora to retrieve one or more features, or sets of features, and one or more associated criteria to send to an image processing system and to a comparator. A comparator is, for example, a statistical analyzer, such as statistical analyzer 350 of FIG. 3. In an embodiment, as used herein, a corpus refers to one or more data sources, such as data sources 424 of FIG. 4, or the various data sources described in FIG. 3. In an embodiment, data sources 424 includes data warehouses, information corpora, data models, and document repositories. In an embodiment, data sources 424 includes an information corpus 426. In an embodiment, information corpus 426 enables data storage and retrieval. In an embodiment, information corpus 426 is a storage mechanism that houses a standardized, consistent, clean, and integrated list of features. In an embodiment, information corpus 426 also stores, for each feature, a list of associated suggestions. For example, information corpus 426 includes the types of computer system components involved (e.g., CPUs, memory, hard drives, graphics cards, software, etc.) and for each occurrence of computer system components, associated suggestions (e.g., change CPU or change memory) is listed. The data is sourced from various operational systems. Data stored in information corpus 426 is structured in a way to specifically address reporting and analytic requirements. In an embodiment, information corpus 426 is a data repository, a relational database, triple store, or text index.

In an embodiment, report analysis module 430 is a computer module that identifies a feature and a suggestion by analyzing one or more unstructured textual reports (e.g., error report or system modification request). In an embodiment, report analysis module 430 includes a feature identifier 432 and a suggestion identifier 434. When an unstructured textual report is received by natural language processing system 412, report analysis module 430 is configured to analyze the report using natural language processing to identify one or more features. In an embodiment, report analysis module 430 first parses the report using natural language processor 414 and related subcomponents 416-422. After parsing the report, feature identifier 432 identifies one or more features present in the report. This is done by, e.g., searching a dictionary (e.g., information corpus 426) using search application 428. In an embodiment, once a feature is identified, feature identifier 432 is configured to transmit the feature to an image processing system and/or to a statistical analyzer (such as shown in FIG. 3).

In an embodiment, suggestion identifier 434 identifies one or more suggestions (e.g., service suggestions) in one or more unstructured textual reports. This is done by using search application 428 to comb through the various data sources (e.g., information corpus 426 or the data sources discussed in FIG. 3) for information and/or reports regarding various service categories (e.g., hardware repair, hardware replacement, software updating, software replacement, etc.) associated with a particular computer system issue. In an embodiment, the list of possible suggestions is predetermined and information related to the list of suggestions (e.g., cost, complexity, availability, likelihood of resolving the issue, etc.) is populated as suggestion information is retrieved. In an embodiment, suggestion identifier 434 searches, using natural language processing, reports from the various data sources for terms in the list of suggestions. After identifying a list of suggestions, suggestion identifier 434 is configured to transmit the list of suggestions to a statistical analyzer (shown in FIGS. 3, 5, and 6).

Figure 5:
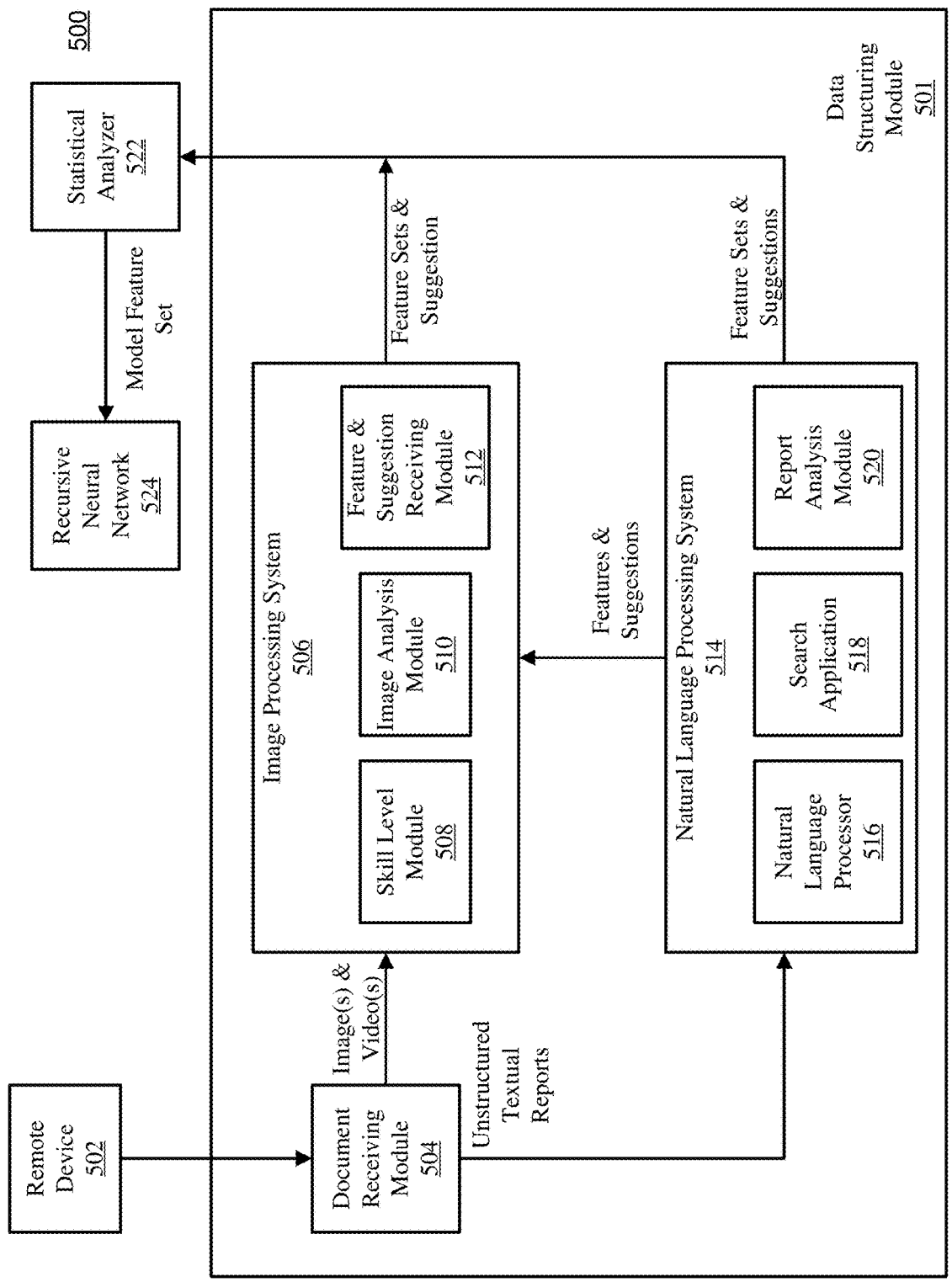
FIG. 5 depicts a block diagram in accordance with an exemplary embodiment of the present invention.

In an embodiment, referring to FIG. 5, shown is a block diagram of an example high level architecture of a system 500 for structuring unstructured textual and visual data, in accordance with embodiments of the present disclosure. In an embodiment, a data structuring module 501 and a statistical analyzer 522 includes the same characteristics as the data structuring module 320 and statistical analyzer 350 of FIG. 3, respectively. In an embodiment, a remote device 502 is substantially similar to one or more of the various data sources described in FIG. 3 and submits data to a document receiving module 504. The data includes one or more reports and one or more images or videos, such as computer diagrams. Document receiving module 504 is configured to receive the data and to send image(s) and video(s) to an image processing system 506 and report(s) to a natural language processing system 514. In an embodiment, some reports (e.g., error reports, skill level reports, etc.) contain both images and text; document receiving module 504 is configured to parse the data to separate the images and text prior to sending the data to image processing system 506 or to a natural language processing system 514.

In an embodiment, a natural language processing system 514 includes the same modules and components as natural language processing system 412 (shown in FIG. 4). Natural language processing system 514 includes, e.g., a natural language processor 516, a search application 518, and a report analysis module 520. Natural language processing system 514 is configured to analyze the textual reports/data to identify one or more features and one or more suggestions relating to the feature(s). In an embodiment, after identifying a feature and a suggestion, natural language processing system 514 transmits the feature and suggestion to image processing system 506. In an embodiment, natural language processing system 514 also transmits both the feature and the suggestion to statistical analyzer 522. Report analysis module 520 is substantially similar to report analysis module 430 of FIG. 4.

In an embodiment, image processing system 506 includes, e.g., a skill level module 508, an image analysis module 510, and a feature & suggestion receiving module 512. Feature & suggestion receiving module 512 is configured to receive, from natural language processing system 514, identified features & suggestions determined by analyzing one or more unstructured textual reports that are related to images/videos received from document receiving module 504. In an embodiment, based on digital file formats (e.g., image file formats and video file formats), image processing system 506 determines with which image processing module (e.g., skill level module 508 or image analysis module 510) the system should analyze the image/video received from document receiving module 504.

In an embodiment, skill level module 508 is configured to recognize, parse, and output structured data representations of hand-drawn and computer-generated computer diagrams, such as, for example, computer performance graphs, screen shots, or diagrams in technician notes. In an embodiment, skill level module 508 interprets, a relative skill level of a user and the degree of information needed for each suggestion based on the user skill level information and the complexity of the suggestion based on relevant information (such as a catalog or a database containing task complexity).

In an embodiment, image analysis module 510 is configured to recognize computer diagrams, still images, or screen shots and output structured data representations (e.g., machine-readable data) of computer system-related data therein. For example, image analysis module 510 is configured to identify, from a still image, a video, or a single frame of a video feed, features and/or suggestions represented in the image or video (e.g., computer parts, computer readouts, computer performance graphs on a screenshot, etc.).

In an embodiment, feature & suggestion receiving module 512 receives features and suggestions identified by report analysis module 520. Features and suggestions identified by report analysis module 520 are related to computer diagrams, images, screenshots or video processed by image processing system 506 (for example, a screenshot or video of a performance graph in a task manager window). In an embodiment, document receiving module 504 parses the screenshot or video and sends the unstructured text portion to natural language processing system 514 and the graphs to image processing system 506. In an embodiment, portions of the data that do not need image processing are sent to statistical analyzer 522. Feature & suggestion receiving module 512 is configured to receive the features and suggestions identified from the textual portion of the image and combine them with the features and suggestions identified from the diagrams of that image to ensure that a robust set of features and suggestions for the particular computer service issue are identified and grouped together.

After image processing system 506 has analyzed any received images/diagrams/videos and natural language processing system 514 has analyzed any received unstructured textual reports for a given computer system issue, the complete feature set (e.g., all the feature sets related to a particular computer system issue) and suggestions are sent to statistical analyzer 522.

In an embodiment, as discussed herein, statistical analyzer 522 determines (e.g., using kMeans or other statistical techniques) which features correlate to which suggestions. For example, if it is determined that free memory (e.g., a feature identified from a screenshot containing a memory usage graph) on a system is below a certain threshold (for example below a certain level suggested by a software manufacture's suggestion). As a result, statistical analyzer 522 could suggest that either memory be freed by upgrading or uninstalling software.

In an embodiment, it is determined that features or characteristics of a computer system require certain upgrades. For example, data structuring module 501 could provide the relative computer system issue information to statistical analyzer 522, allowing statistical analyzer 522 to determine likely solutions and their confidence values. Further, for example, data structuring module 501 could provide the relative user skill information to statistical analyzer 522, allowing statistical analyzer 522 to determine the amount of information the detail level to be given for each suggestion by determining the user's skill level for each suggestion.

After statistical analyzer 522 has digested a sufficient number of features and suggestions received from data structuring module 501 (e.g., the number of features and suggestions required for a robust and reliable computer change model for change suggestions, confidence values, and determining the detail level needed for each suggestion due to the user's skill), a model feature set is output to a recursive neural network 524. A model feature set includes features from a wide variety of computer system issues and change suggestions for the computer system issues. A model feature set is a static set of data, or it is dynamically updated "on-the-fly" as statistical analyzer 522 continuously receives additional features and suggestions from data structuring module 501.

In an embodiment, recursive neural network 524 is a multi-layer perceptron, a system of sigmoid neurons, a directed acyclic graph comprising a plurality of corelets, or any other structure/system capable of neural networking.

In an embodiment, recursive neural network 524 is used to conduct simulations of computer service issues wherein certain parameters of the simulation (e.g. certain features) are defined and/or manipulated by one or more users. Such simulations are used to determine that novel features (e.g., features not encountered or identified from any reports from the various data sources) or uncommon features are at issue than conventional or common change solutions.

In an embodiment, recursive neural network 524 utilizes the model feature set to analyze real-time input received from the sensors of the computer system and determine which suggestion is most likely to provide a solution to the issue. In an embodiment, recursive neural network 524 determines that no solution would sufficiently resolve the issue. For example, recursive neural network 524 could determine that the current system could not handle the requisite memory and determine that the system is not capable of performing with the requested performance metrics.

Figure 6:
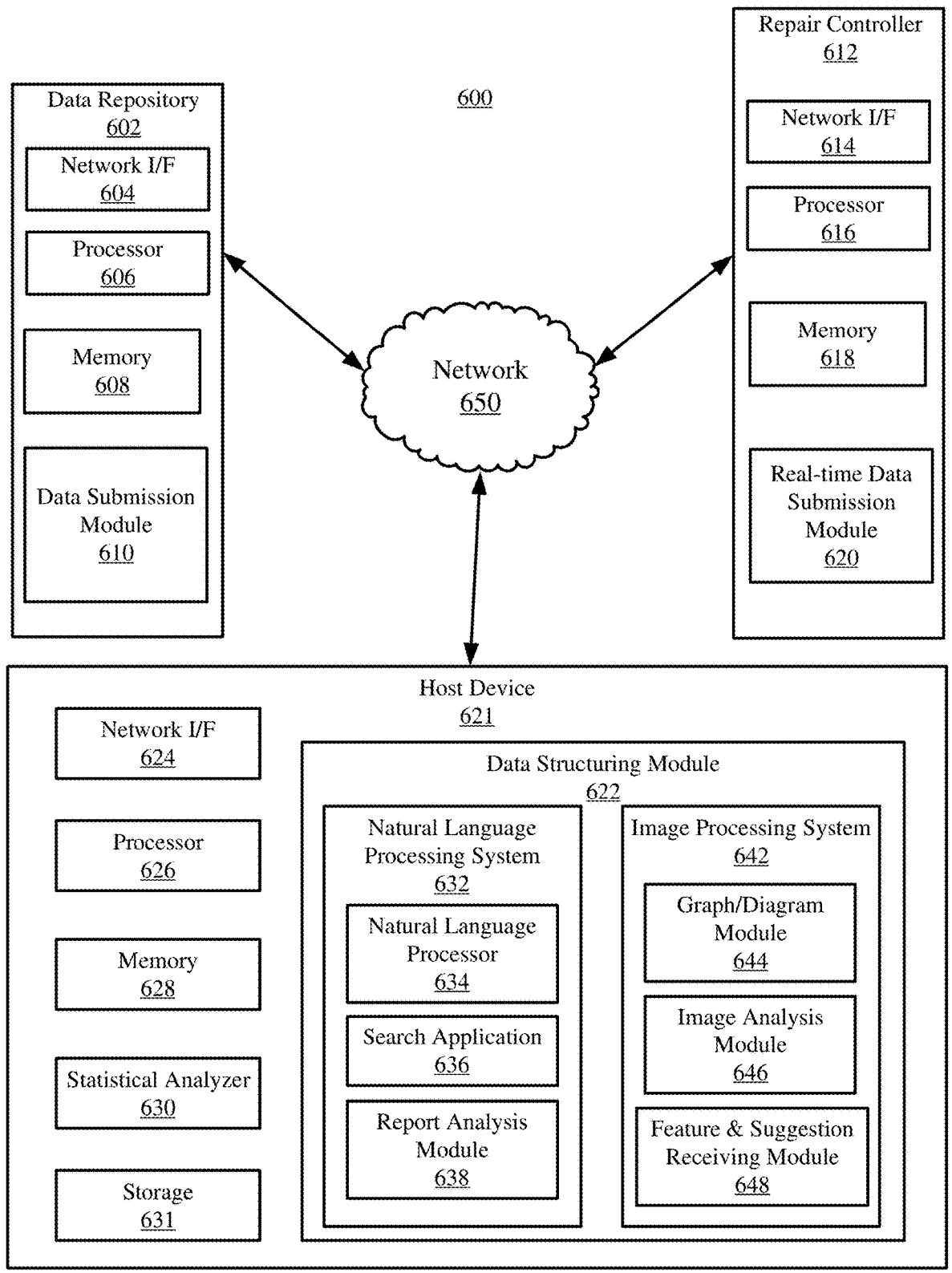
FIG. 6 depicts a block diagram in accordance with an exemplary embodiment of the present invention.

Referring now to FIG. 6, illustrated is a block diagram of an example computing environment 600 for creating computer change models and employing them to assist a user in selecting a solution, in accordance with embodiments of the present disclosure. Consistent with various embodiments, the host device 621, the data repository 602, and a remote device 612 include, or are, computer systems. The host device 621, the data repository 602, and remote device 612 each includes one or more processors 626, 606, and 616 and one or more memories 628, 608, and 618, respectively. The host device 621, the data repository 602, and remote device 612 are configured to communicate with each other through an internal or external network interface 624, 604, and 614, respectively. In an embodiment, the network interfaces 624, 604, and 614 are, e.g., modems or network interface cards. In an embodiment, the host device 621, the data repository 602, and remote device 612 is equipped with a display or monitor (not pictured). Additionally, in an embodiment, the host device 621, the data repository 602, and remote device 612 include optional input devices (e.g., a keyboard, mouse, scanner, or other input device), and/or any commercially available or custom software (e.g., browser software, communications software, server software, speech recognition software, natural language processing software, search engine and/or web crawling software, filter modules for filtering content based upon predefined parameters, etc.). In an embodiment, the host device 621, the data repository 602, and remote device 612 include or are servers, desktops, laptops, or hand-held devices.

In an embodiment, host device 621, the data repository 602, and remote device 612 is distant from each other and communicate over a network 650. In an embodiment, the host device 621 is a central hub from which data repository 602 and remote device 612 can establish a communication connection, such as in a client-server networking model. Alternatively, the host device 621, the data repository 602, and remote device 612 are configured in any other suitable networking relationship (e.g., in a peer-to-peer configuration or using any other network topology).

In an embodiment, data repository 602 is substantially similar to any or all of the various data sources discussed in FIG. 3, data sources 424 of FIG. 4, or remote device 502 of FIG. 5. In an embodiment, data repository 602 submits data, using data submission module 610, via network 650 to host device 621. In an embodiment, host device 621 then generates a computer change model to be used in determining the change requests that remote device 612 will execute.

In an embodiment, remote device 612 enables users to submit (or submits automatically with or without user input) electronic data (e.g., real-time computer system status) to the host device 621 in order to identify real-time features to utilize in a computer change model for determining computer changes for remote device 612. For example, remote device 612 includes real-time data submission module 620 and a user interface (UI). The UI is any type of interface (e.g., command line prompts, menu screens, graphical user interfaces). The UI allows a user to interact with the host device 621 to submit, using the real-time data submission module 620, real-time features to the host device 621.

In an embodiment, the host device 621 includes a data structuring module 622. Data structuring module 622 is substantially similar to data structuring module 320 of FIG. 3, or data structuring module 501 of FIG. 5.

In an embodiment, the data structuring module 622 includes a natural language processing system 632, which is substantially similar to natural language processing system 412 of FIG. 4 or natural language processing system 514 of FIG. 5. The natural language processing system 632 includes a natural language processor 634, a search application 636, and a report analysis module 638. The natural language processor 634 can include numerous subcomponents, such as a tokenizer, a part-of-speech (POS) tagger, a semantic relationship identifier, and a syntactic relationship identifier.

The search application 636 is implemented using a conventional or other search engine, and is distributed across multiple computer systems. The search application 636 is configured to search one or more databases, as described herein, or other computer systems for content that is related to an electronic document (such as an error report) submitted by, or retrieved from, a data repository 602. For example, the search application 636 is configured to search dictionaries, catalogs, and/or archived error reports to help identify one or more features, and suggestions associated with the features, relating to the change request. The report analysis module 638 is configured to analyze an error reports or service requests to identify service and suggestions (e.g., steps to be taken to resolve the issue). In an embodiment, the report analysis module 638 includes one or more modules or units, and utilizes the search application 636, to perform its functions (e.g., to identify a feature and a suggestion), as discussed in more detail in reference to FIGS. 3-5.

In an embodiment, the data structuring module 622 includes an image processing system 642. Image processing system 642 is substantially similar to image processing system 506 of FIG. 5. In an embodiment, image processing system considers 642 features and suggestions identified by the natural language processing system 632 (e.g., features and suggestions received by feature & suggestion receiving module 648) when identifying features and suggestions from an image, video, or diagram received or retrieved from data repository 602. In an embodiment, image processing system 642 utilizes one or more models, modules, or units to perform its functions (e.g., to analyze an image/video/diagram and identify feature sets and suggestions). For example, image processing system 642 could include one or more image processing modules that are configured to identify specific features and suggestions in an error report, service request, screen shot, recording of a display, etc. The image processing modules include, by way of example, a graph diagram module 644 to analyze computer performance diagrams and graphs to identify features and suggestions. As another example, image processing system 642 includes an image analysis module 646 to identify features and suggestion from screen shots, videos, computer diagrams, and real-time performance graphics. In an embodiment, the image processing modules are implemented as software modules. In an embodiment, graph diagram module 644 and image analysis module 646 are combined into a single software module or divided among the several components of the host device 621 or the data structuring module 622.

In an embodiment, image processing system 642 includes a feature & suggestion receiving module 648. The feature & suggestion receiving module 648 is substantially similar to feature & suggestions receiving module 512 of FIG. 5.

In an embodiment, the host device 621 includes a statistical analyzer 630. The statistical analyzer 630 is configured to receive features and suggestions from the natural language processing system 632 and an image analysis from image processing system 642 (e.g., the statistical analyzer 630 is substantially similar to the statistical analyzer 350 of FIG. 3 and 522 of FIG. 5).

In an embodiment, the data structuring module 622 has an optical character recognition (OCR) module (not pictured). In an embodiment, the OCR module is configured to receive an analog format of an unstructured textual report sent from a data repository 602 and perform optical character recognition (or a related process) on the report to convert it into machine-encoded text so that the natural language processing system 632 performs natural language processing on the report. For example, the data repository 602 could transmit an image of a scanned service request to the host device. The OCR module could convert the image into machine-encoded text, and then the converted report is sent to the natural language processing system 632 for analysis. In an embodiment, the OCR module is a subcomponent of the natural language processing system 632. In other embodiments, the OCR module is a standalone module within the host device 621 or data structuring module 622. In still other embodiments, the OCR module is located within the data repository 602 and performs OCR on the unstructured, analog textual reports before they are sent to the host device 621 or data structuring module 622.

In an embodiment, host device 621 further includes storage 631 for storing features, suggestions, and computer system change request models. Computer system change request models are loaded into active memory (e.g., memory 628 or memory 618) to process real-time input (e.g., data received from real-time data submission module 620) to determine a set of change suggestions that a remote device 612 should execute in light of real-time features (e.g., current memory usage).

While FIG. 6 illustrates a computing environment 600 with a single host device 621, a single data repository 602, and a single remote device 612, suitable computing environments for implementing embodiments of this disclosure includes any number of host devices, data repositories, and remote devices. In an embodiment, the various models, modules, systems, and components discussed in relation to FIG. 6 exist, if at all, across a plurality of host devices, data repositories, and remote devices. For example, some embodiments include two host devices and multiple data repositories. The two host devices are communicatively coupled using any suitable communications connection (e.g., using a WAN, a LAN, a wired connection, an intranet, or the Internet). The first host device includes a natural language processing system configured to receive and analyze unstructured textual reports, and the second host device includes an image processing system configured to receive and analyze diagrams, images, or screenshots.

In an embodiment, it is noted that FIG. 6 is intended to depict the representative major components of an exemplary computing environment 600. In an embodiment, however, individual components have greater or lesser complexity than as represented in FIG. 6, components other than or in addition to those shown in FIG. 6 are present, and the number, type, and configuration of such components may vary.

Figure 7:
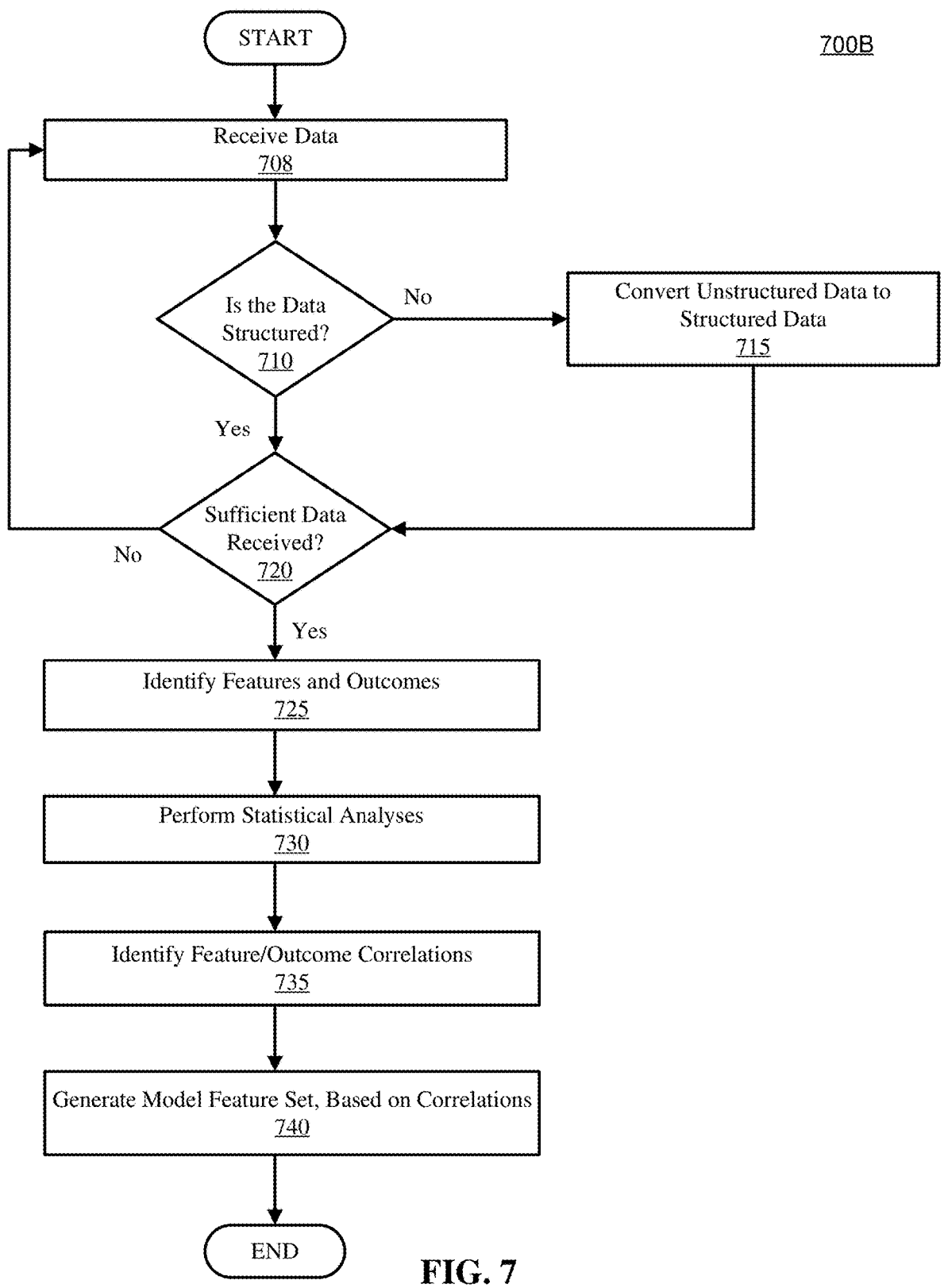
FIG. 7 depicts a flow diagram in accordance with an exemplary embodiment of the present invention.
Figure 8:
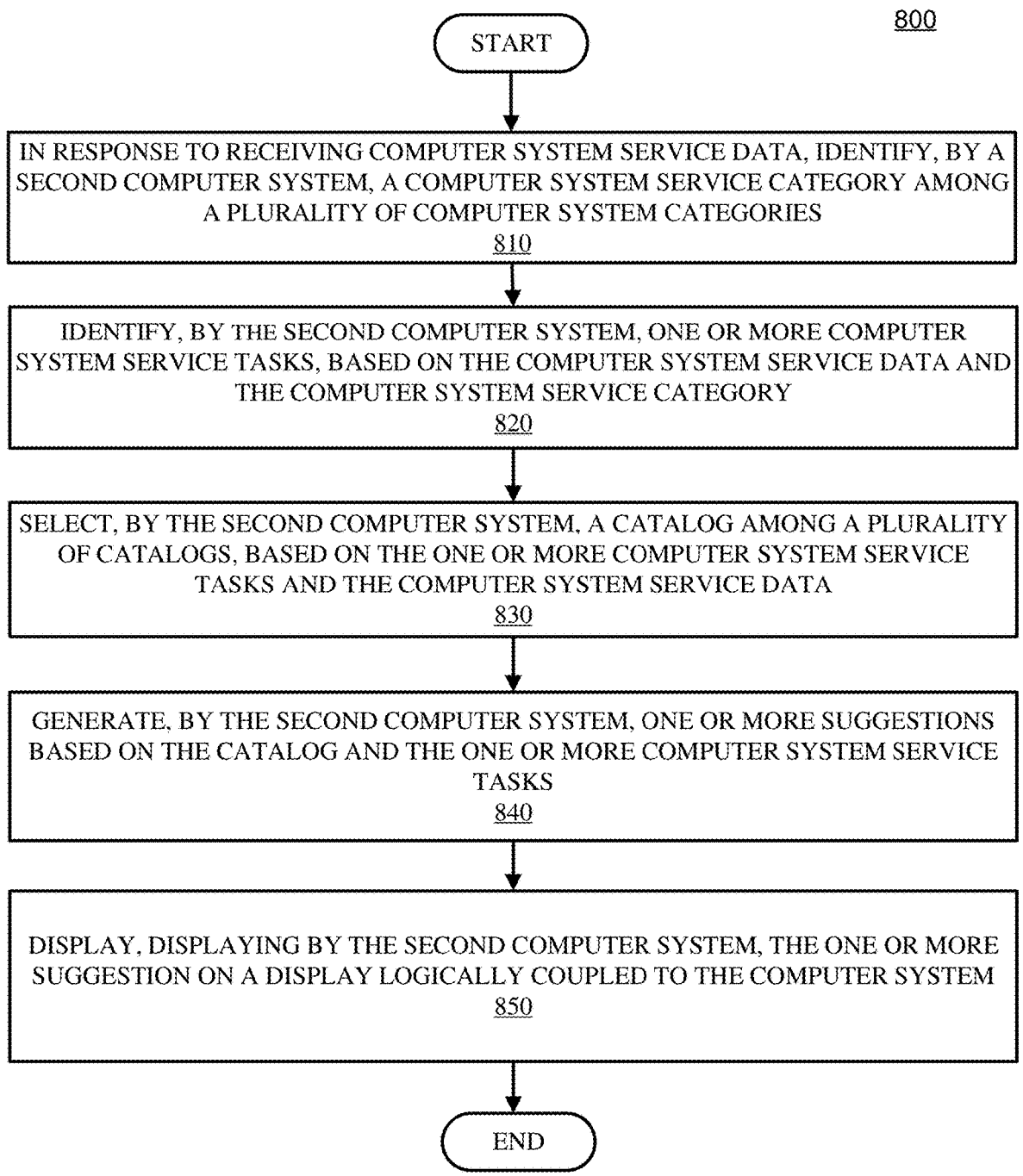
FIG. 8 depicts a flow diagram in accordance with an exemplary embodiment of the present invention.

In an embodiment, referring now to FIG. 7, shown is a method 700 for generating a model feature set, in accordance with embodiments of the present disclosure. At 708, data is received. Data includes, for example, data from any of the sources discussed in relation to FIGS. 3-4. Data could be received in response to a query (e.g., "pulled") of a data source, or data could be received automatically or at specific intervals from a data source (e.g., "pushed").

In an embodiment, at 710, it is determined whether the received data is structured. Structured data includes machine-readable data or any data that does not require further processing to be utilized in a statistical analysis or the generation of a computer change model.

In an embodiment, if it is determined, at 710, that received data is not structured, unstructured data is converted into structured data at 715. Techniques for converting unstructured data into structured data are discussed in detail in the descriptions of FIGS. 3-6 and includes, for example, natural language processing techniques, image processing techniques, optical character recognition, etc. In an embodiment, if it is determined, at 710, that received data is structured, the method proceeds to 720.

In an embodiment, at 720, it is determined if sufficient data has been received. For example, in order to build robust and effective models, a certain volume of data (e.g., a certain number of data entries for a number of data points in a statistical analysis) or a particular sample size is required. A threshold for determining whether a sufficient amount of data has been received is employed, and the threshold is based on user input or standards for statistical analyses that are well-known in the art.

In an embodiment, if, at 720, it is determined that sufficient data has been received, features and outcomes are identified at 725. Features include the conditions that lead or contribute to the occurrence of a computer service issue. Outcomes include the results of previous computer service issues and their solutions. In an embodiment, if, at 720, it is determined that sufficient data has not been received, the user is queried for more information and the additional data is received at 708.

In an embodiment, at 730, statistical analyses are performed to characterize the features and outcomes. Techniques for performing statistical analyses (e.g., clustering techniques), are described in greater detail herein.

In an embodiment, at 735, correlations between the features and the outcomes are identified, as described herein.

In an embodiment, at 740, a model feature set is generated, based on the correlations identified. For example, as described herein, features (e.g., bad screen resolution, lack of memory, slow processing, etc.) could correlate to an increased (or decreased) risk of the occurrence of a computer issue, and could further correlate to an increased (or decreased) level of severity regarding service suggestions (e.g., install new software, replace hard drive, add more memory, etc.). A model feature set includes rules, algorithms, neural network configurations/parameters, etc. representing these correlations. As such, a model feature set is utilized to perform, for example, a computer simulation of a computer service issue according to a list of selected features or to determine which computer service suggestion should execute to maximize the likelihood of solving the issue, given a set of unalterable real-time features (e.g., computer system conditions).

In an embodiment, a model feature set is dynamic. In other words, the model feature set may update "on-the-fly" as more data is received and processed to produce more accurate correlation representations from the increased sample size.

In an embodiment, method 800 includes, an operation 810 of in response to receiving computer system service data, identifying, by a second computer system, a computer system service category among a plurality of computer system categories, an operation 820 of identifying, by the second computer system, one or more computer system service tasks, based on the computer system service data and the computer system service category, an operation 830 of selecting, by the second computer system, a catalog among a plurality of catalogs, based on the one or more computer system service tasks and the computer system service data, an operation 840 of generating, by the second computer system, one or more suggestions based on the catalog and the one or more computer system service tasks, and an operation 850 of displaying, displaying by the second computer system, the one or more suggestion on a display logically coupled to the computer system.

Computer System

Figure 9:
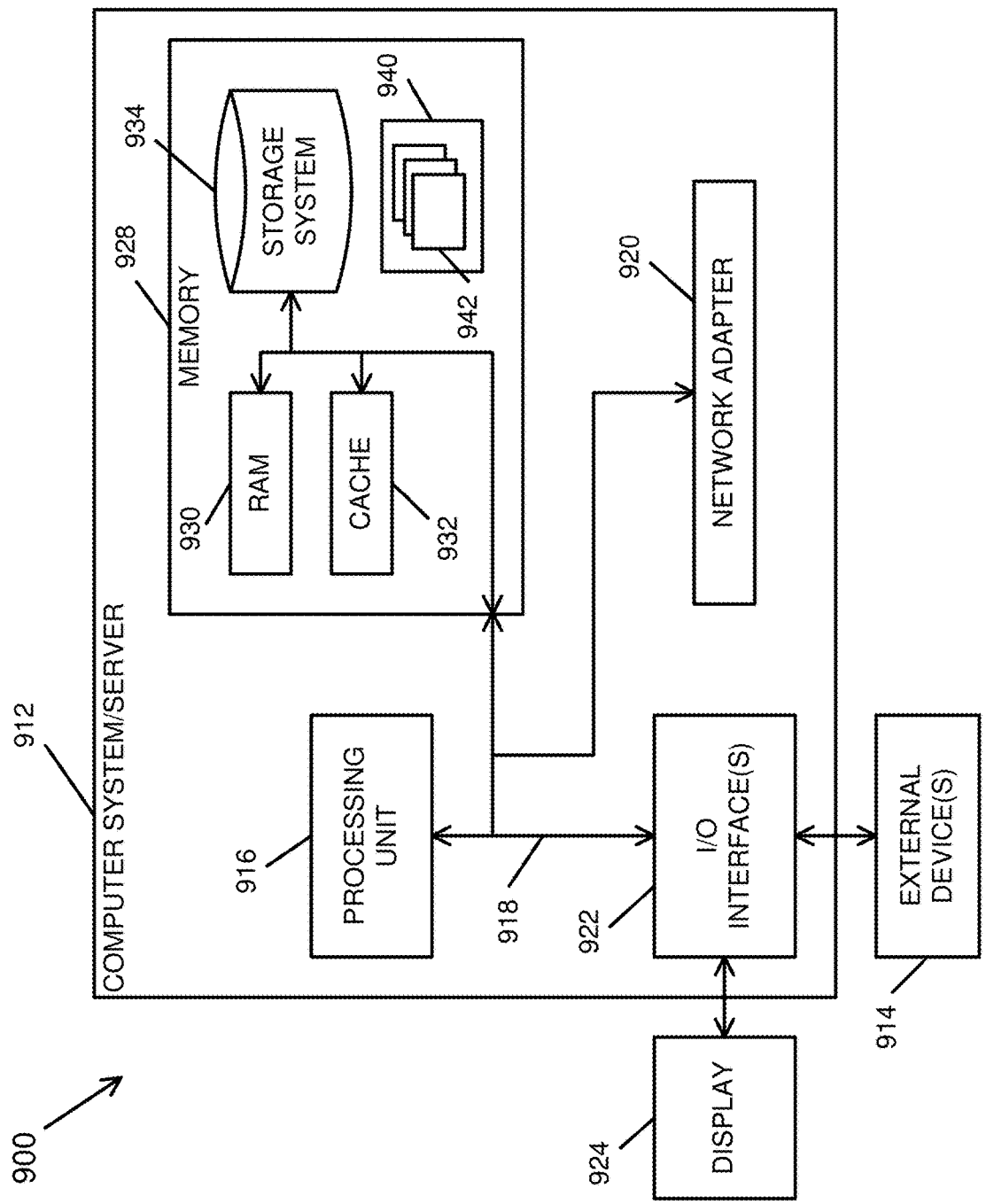
FIG. 9 depicts a computer system in accordance with an exemplary embodiment of the present invention.

In an exemplary embodiment, the computer system is a computer system 900 as shown in FIG. 9. Computer system 900 is only one example of a computer system and is not intended to suggest any limitation as to the scope of use or functionality of embodiments of the present invention. Regardless, computer system 900 is capable of being implemented to perform and/or performing any of the functionality/operations of the present invention.

Computer system 900 includes a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 912 may be described in the general context of computer system-executable instructions, such as program modules, being executed by a computer system. Generally, program modules may include routines, programs, objects, components, logic, and/or data structures that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computer system 900 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and includes both volatile and non-volatile media, removable and non-removable media.

System memory 928 can include computer system readable media in the form of volatile memory, such as random access memory (RAM) 930 and/or cache memory 932.

Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions/operations of embodiments of the invention.

Program/utility 940, having a set (at least one) of program modules 942, may be stored in memory 928 by way of example, and not limitation. Exemplary program modules 942 may include an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the present invention.

Computer system/server 912 may also communicate with one or more external devices 914 such as a keyboard, a pointing device, a display 924, one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
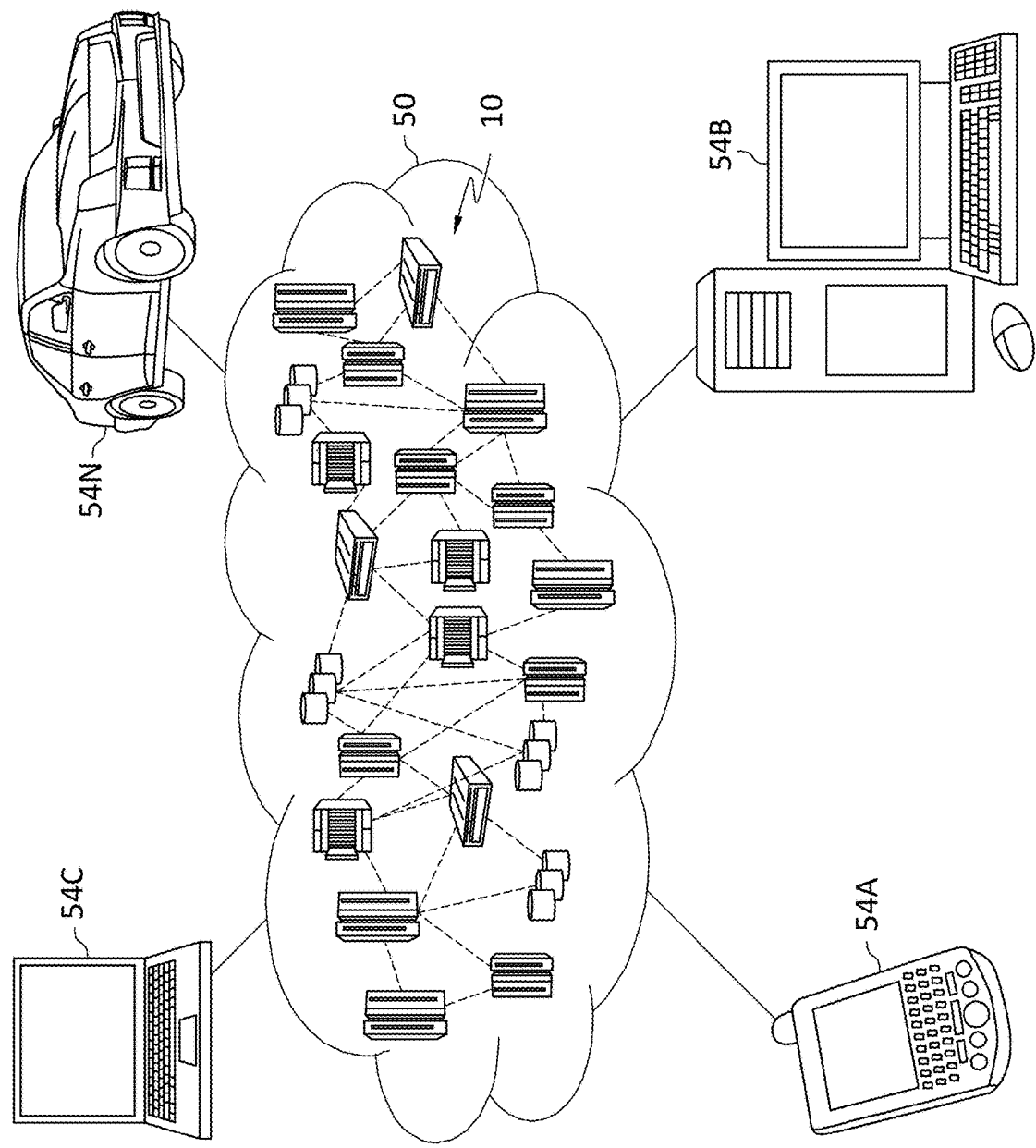
FIG. 10 depicts a cloud computing environment according to various embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
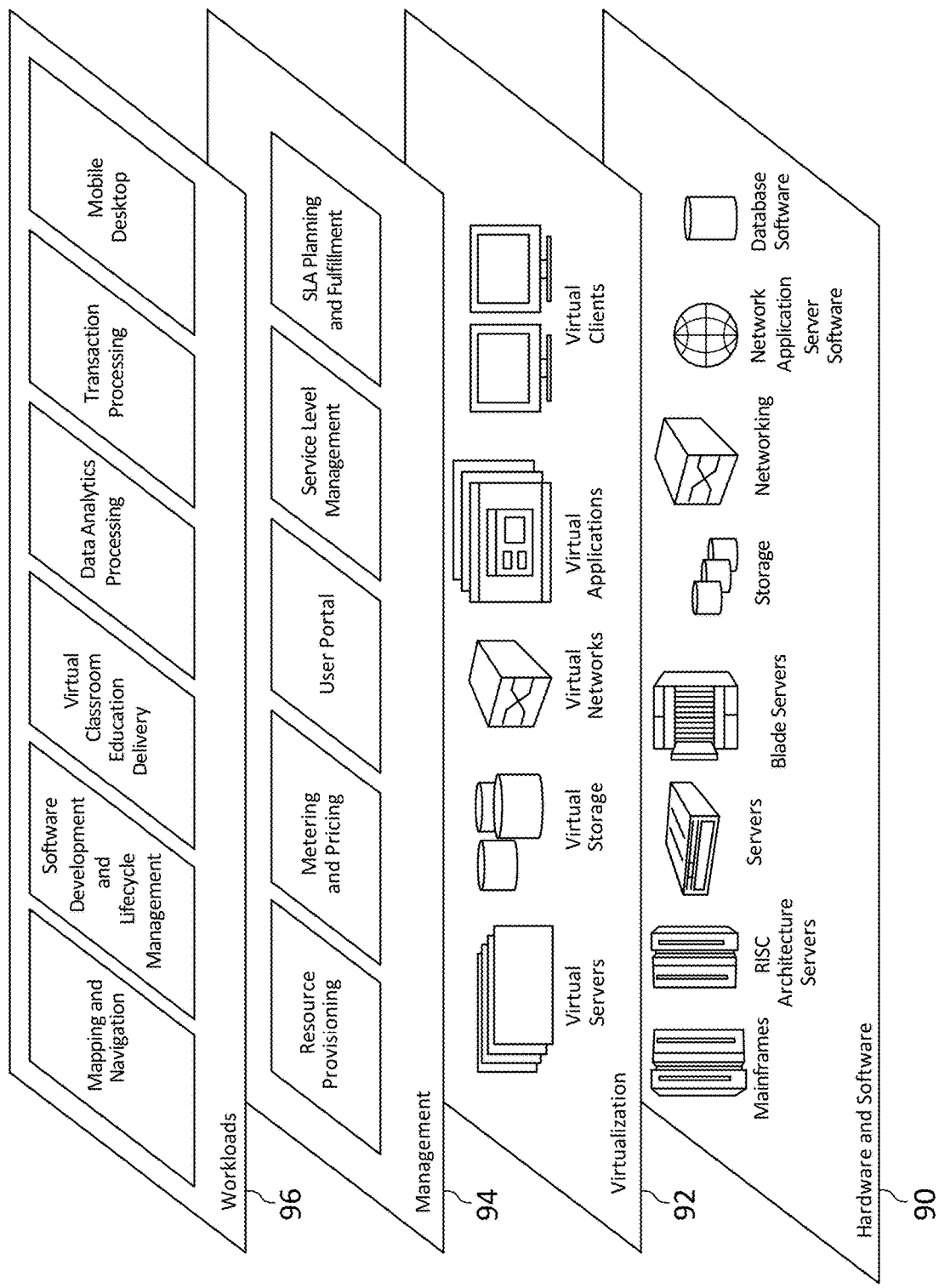
FIG. 11 depicts abstraction model layers according to various embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 90 includes hardware and software components. Examples of hardware components include: mainframes; RISC (Reduced Instruction Set Computer) architecture based servers; storage devices; networks and networking components. In some embodiments, software components include network application server software.

Virtualization layer 92 provides an abstraction layer from which the following examples of virtual entities may be provided: virtual servers; virtual storage; virtual networks, including virtual private networks; virtual applications and operating systems; and virtual clients.

In one example, management layer 94 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 96 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims is amended.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

What is claimed is:

1. A method comprising:
in response to receiving computer system service data, identifying, by a second computer system, a computer system service category among a plurality of computer system categories;
identifying, by the second computer system, one or more computer system service tasks, based on the computer system service data and the computer system service category;
generating, by the second computer system, one or more suggestions based on the one or more computer system service tasks;
displaying, by the second computer system, the one or more suggestions on a display logically coupled to the computer system;
accessing, by the second computer system, a skill level of a user with respect to at least one computer system service category among the plurality of computer system service categories and the one or more computer system service tasks; and
modifying, by the second computer system, an amount of detail given in the one or more suggestions, based on the skill level.

2. The method of claim 1, further comprising:
receiving a task selection; and
generating, by the second computer system in response to the receiving, execution content.

3. The method of claim 1, further comprising based on one or more previous selections by the user, personalizing, by the second computer system, the one or more suggestions via machine learning.

4. The method of claim 1, further comprising:
in response to the displaying, identifying, by the second computer system, missing parameters with respect to the computer system service data;
selecting, by the second computer system, a catalog among a plurality of catalogs, based on the one or more computer system service tasks and the computer system service data; and
querying, of a user, one or more of the missing parameters of the received computer system service data in light of the catalog.

5. The method of claim 4, further comprising:
receiving the one or more missing parameters; and
generating, by the second computer system in response to the receiving, one or more modified suggestions.

6. The method of claim 4, further comprising receiving the one or more missing parameters, wherein the selecting is in response to the receiving.

7. A system comprising:
a memory; and
a processor in communication with the memory, the processor configured to perform a method comprising:
in response to receiving computer system service data, identifying a computer system service category among a plurality of computer system categories;
identifying one or more computer system service tasks, based on the computer system service data and the computer system service category;
generating one or more suggestions based on the one or more computer system service tasks;
displaying the one or more suggestions on a display logically coupled to the computer system;
accessing a skill level of a user with respect to at least one computer system service category among the plurality of computer system service categories and the one or more computer system service tasks; and
modify an amount of detail given in the one or more suggestions, based on the skill level.

8. The system of claim 7, wherein the method the processor is configured to perform further comprises, in response to receiving a task selection, generating execution content.

9. The system of claim 7, wherein the method the processor is configured to perform further comprises, based on one or more previous selections by the user, personalizing the one or more suggestions via machine learning.

10. The system of claim 7, wherein the method the processor is configured to perform further comprises:
in response to the displaying, identifying missing parameters with respect to the computer system service data;
selecting a catalog among a plurality of catalogs, based on the one or more computer system service tasks and the computer system service data; and
querying, of a user, one or more of the missing parameters of the received computer system service data in light of the catalog.

11. The system of claim 10, wherein the method the processor is configured to perform further comprises, in response to receiving the one or more missing parameters, generating one or more modified suggestions.

12. The system of claim 10, wherein the method the processor is configured to perform further comprises, in response to receiving the one or more missing parameters, selecting a catalog among the plurality of catalogs.

13. A computer program product comprising a computer readable storage medium having program instructions embodied therewith, the program instructions executable by a processor to cause the processor to perform a method comprising:
in response to receiving computer system service data, identifying, by a second computer system, a computer system service category among a plurality of computer system categories;
identifying, by the second computer system, one or more computer system service tasks, based on the computer system service data and the computer system service category;
generating, by the second computer system, one or more suggestions based on the one or more computer system service tasks;
displaying, by the second computer system, the one or more suggestions on a display logically coupled to the computer system;
accessing, by the second computer system, a skill level of a user with respect to at least one computer system service category among the plurality of computer system service categories and the one or more computer system service tasks; and
modifying, by the second computer system, an amount of detail given in the one or more suggestions, based on the skill level.

14. The computer program product of claim 13, wherein the method the performed by the processor further comprises, in response to receiving a task selection, generating, by the second computer system, execution content.

15. The computer program product of claim 13, wherein the method the performed by the processor further comprises, based on one or more previous selections by the user, personalizing, by the second computer system, the one or more suggestions via machine learning.

16. The computer program product of claim 13, wherein the method the performed by the processor further comprises:
in response to the displaying, identifying, by the second computer system, missing parameters with respect to the computer system service data;
selecting a catalog among a plurality of catalogs, based on the one or more computer system service tasks and the computer system service data; and
querying, of a user, one or more of the missing parameters of the received computer system service data in light of the catalog.

17. The computer program product of claim 16, wherein the method the performed by the processor further comprises, in response to receiving the one or more missing parameters, generating, by the second computer system, one or more modified suggestions.

* * * * *